United States Patent
Carpenter et al.

(10) Patent No.: US 7,591,414 B2
(45) Date of Patent: *Sep. 22, 2009

(54) AUTOMATED BANKING MACHINE

(75) Inventors: Keith Carpenter, Akron, OH (US); Craig Hockman, North Canton, OH (US); Willis Miller, Cuyahoga Falls, OH (US); Laura Drozda, North Canton, OH (US); Paul Burns, Munroe Falls, OH (US); Thomas B. Phillips, Charlotte, NC (US); John C. Valcore, Hudson, OH (US); H. Thomas Graef, Bolivar, OH (US); Edward L. Laskowski, Seven Hills, OH (US); James Meek, Canton, OH (US); Martin J. Brown, Canton, OH (US); Todd Galloway, North Canton, OH (US); Robert W. Barnett, Canton, OH (US); Mike Ryan, Canton, OH (US); James R. Kay, Uniontown, OH (US); Mark A. Ward, North Canton, OH (US); David A. Peters, Tallmadge, OH (US); Greg Miller, Canton, OH (US); Arindam Laha, North Canton, OH (US); Joseph M. Altier, Uniontown, OH (US)

(73) Assignee: Diebold, Incorporated, North Canton, OH (US)

( * ) Notice: Subject to any disclaimer, the term of this patent is extended or adjusted under 35 U.S.C. 154(b) by 723 days.

This patent is subject to a terminal disclaimer.

(21) Appl. No.: 11/324,903

(22) Filed: Jan. 3, 2006

(65) Prior Publication Data

US 2006/0163342 A1 Jul. 27, 2006

Related U.S. Application Data

(60) Continuation-in-part of application No. 10/830,191, filed on Apr. 21, 2004, now Pat. No. 6,981,638, which (Continued)

(60) Provisional application No. 60/733,093, filed on Nov. 2, 2005, provisional application No. 60/338,919, filed (Continued)

(51) Int. Cl.
*G07F 19/00* (2006.01)
(52) U.S. Cl. .................... 235/379; 235/380
(58) Field of Classification Search ................ 235/379, 235/380, 375; 705/35, 42
See application file for complete search history.

(56) References Cited

U.S. PATENT DOCUMENTS

2007/0095895 A1* 5/2007 Carpenter et al. .......... 235/379

* cited by examiner

*Primary Examiner*—Karl D. Frech
(74) *Attorney, Agent, or Firm*—Ralph E. Jocke; Daniel D. Wasil; Walker & Jocke

(57) ABSTRACT

An automated banking machine (10) includes a user interface (12) including an opening (20). Users of the machine deliver individual sheets and stacks of sheets to and from the machine through the opening. Stacks of sheets may include sheets such as notes, checks or other documents. Stacks input to the machine may include mixtures of various types of sheets. The machine operates to receive notes, process checks and perform other operations. Notes received in the machine may be recycled and dispensed to other users. Checks processed by the machine may be imaged by an imaging device, cancelled and stored in the machine or alternatively returned to a user.

25 Claims, 26 Drawing Sheets

Related U.S. Application Data is a division of application No. 09/993,070, filed on Nov. 13, 2001, now Pat. No. 6,749,111, and a continuation-in-part of application No. 09/911,329, filed on Jul. 23, 2001, now Pat. No. 6,607,081, and a continuation-in-part of application No. 09/664,698, filed on Sep. 19, 2000, now Pat. No. 6,315,194, and a continuation-in-part of application No. 09/390,929, filed on Sep. 7, 1999, now Pat. No. 6,331,000, said application No. 09/911,329 and a continuation-in-part of application No. 09/633,486, filed on Aug. 7, 2000, now Pat. No. 6,573,983, is a continuation-in-part of application No. 09/135,384, filed on Aug. 17, 1998, now Pat. No. 6,101,266, which is a continuation-in-part of application No. 08/980,467, filed on Nov. 28, 1997, now Pat. No. 6,273,413, which is a continuation-in-part of application No. 08/749,260, filed on Nov. 15, 1996, now Pat. No. 5,923,413, said application No. 09/390,929 is a continuation-in-part of application No. 11/168,131, filed on Jun. 27, 2005, now Pat. No. 7,438,219, which is a continuation-in-part of application No. 11/039,655, filed on Jan. 19, 2005, application No. 11/324,903, which is a continuation-in-part of application No. 11/039,655, filed on Jan. 19, 2005, and a continuation-in-part of application No. 09/723,304, filed on Nov. 27, 2000, said application No. 11/039,655 is a continuation-in-part of application No. 10/944,578, filed on Sep. 16, 2004, application No. 11/324,903, filed on Jan. 3, 2006, which is a continuation-in-part of application No. 10/944,224, filed on Sep. 16, 2004, now Pat. No. 7,207,478, which is a continuation-in-part of application No. 09/723,304, filed on Nov. 27, 2000, application No. 11/324,903, which is a continuation-in-part of application No. 09/723,304, filed on Nov. 27, 2000.

(60) on Nov. 5, 2001, provisional application No. 60/100,758, filed on Sep. 17, 1998, provisional application No. 60/155,281, filed on Sep. 21, 1999, provisional application No. 60/167,996, filed on Nov. 30, 1999, provisional application No. 60/504,282, filed on Sep. 17, 2003, provisional application No. 60/504,776, filed on Sep. 17, 2003, provisional application No. 60/503,825, filed on Sep. 22, 2003, provisional application No. 60/537,581, filed on Jan. 20, 2004, provisional application No. 60/537,788, filed on Jan. 20, 2004, provisional application No. 60/537,795, filed on Jan. 20, 2004, provisional application No. 60/584,622, filed on Jun. 29, 2004, provisional application No. 60/584,592, filed on Jun. 29, 2004, provisional application No. 60/584,532, filed on Jun. 29, 2004, provisional application No. 60/584,742, filed on Jun. 29, 2004, provisional application No. 60/584,578, filed on Jun. 29, 2004, provisional application No. 60/678,916, filed on May 6, 2005, provisional application No. 60/537,581, filed on Jan. 20, 2004, provisional application No. 60/537,795, filed on Jan. 20, 2004, provisional application No. 60/537,788, filed on Jan. 20, 2004, provisional application No. 60/584,622, filed on Jun. 29, 2004.

Fig 24

Thomas R. Smith
100 Newberry Ave.
Your Town USA 12435
(330) 555-1234

Date _____ 225
12-345
678

Pay to the order of _____ $ 43.12

_____ Dollars

ANY BANK, NA
Your Town, USA
For _____ NON_NEGOTIABLE

⑆000067894⑆ 12345678⑈

CHECK AMOUNT = $43.12
IS THIS CORRECT?

YES ---------------->
NO ----------------->

TO INSURE PROPER CREDIT TO YOUR ACCOUNT, PLEASE RETURN THIS PORTION WITH PAYMENT 03   02   08
  108
NEVADA
POWER

MAKE CHECKS PAYABLE TO NEVADA POWER CO.

5/13/97
H
COMPANY

| Previous Balance | 15.75 |
| Current Charges | 16.22 |
| Total Amount Due | 31.97 |

03  1014802-07-6     DUE: 5/29/97
BENJAMIN JANELLE
*TRAINING USE ONLY *
8325 MULCAHY AV
LAS VEGAS NV.  89128
        Nevada Power Company
        P.O. Box 98955
        Las Vegas NV 89183-8855

1014802076000003197000000016220

BILL AMOUNT = $31.97
IS THIS CORRECT?

YES ---------------->
NO ----------------->

— 208
— 204
— 200
— 210
— 214
— 202

AUTOMATED BANKING MACHINE

CROSS REFERENCE TO RELATED APPLICATIONS

This application claims benefit under 35 USC § 119(e) of U.S. provisional application 60/733,093 filed Nov. 2, 2005.

This application claims the benefit under 35 USC § 120 of U.S. application Ser. No. 10/830,191 filed Apr. 21, 2004, which along with this application claims the benefit under 35 USC § 120 of U.S. application Ser. No. 09/993,070 filed Nov. 13, 2001, now U.S. Pat. No. 6,749,111, which along with this application claims the benefit under 35 USC § 119(e) of U.S. provisional application 60/338,919 filed Nov. 5, 2001. U.S. application Ser. No. 09/993,070 and this application also claims the benefit under 35 USC § 120 of each of U.S. application Ser. No. 09/911,329 filed Jul. 23, 2001, now U.S. Pat. No. 6,607,081; U.S. application Ser. No. 09/390,929 filed Sep. 7, 1999, now U.S. Pat. No. 6,331,000; and U.S. application Ser. No. 09/664,698 filed Sep. 19, 2000, now U.S. Pat. No. 6,315,194. U.S. application Ser. No. 09/911,329 and this application claims the benefit under 35 USC § 120 of U.S. application Ser. No. 08/980,467 filed Nov. 28, 1997, now U.S. Pat. No. 6,273,413, and U.S. application Ser. No. 09/633,486 filed Aug. 7, 2000, now U.S. Pat. No. 6,573,983. U.S. application Ser. No. 09/633,486 and this application claims the benefit under 35 USC § 120 of U.S. application Ser. No. 09/135,384 filed Aug. 17, 1998, now U.S. Pat. No. 6,101,266, which along with this application claims the benefit under 35 USC § 120 of U.S. application Ser. No. 08/749,260 filed Nov. 15, 1996, now U.S. Pat. No. 5,923,413. U.S. application Ser. No. 09/390,929 and this application claims the benefit under 35 USC § 119(e) of U.S. provisional application 60/100,758 filed Sep. 17, 1998. U.S. application Ser. No. 09/664,698 and this application claims the benefit under 35 USC § 119(e) of U.S. provisional application 60/155,281 filed Sep. 21, 1999.

This application also claims the benefit under 35 USC § 120 of U.S. application Ser. No. 11/168,131 filed Jun. 27, 2005, and also claims benefit under 35 U.S.C. § 120 of U.S. application Ser. No. 11/039,655 filed Jan. 19, 2005 and also claims benefit under 35 U.S.C. § 120 of U.S. application Ser. No. 10/944,224 filed Sep. 16, 2004, and also claims the benefit under 35 USC § 120 of U.S. application Ser. No. 09/723,304 filed Nov. 27, 2000, which along with this application claims the benefit under 35 USC § 119(e) of U.S. provisional application 60/167,996 filed Nov. 30, 1999. U.S. application Ser. No. 10/944,224 and this application also claims the benefit pursuant to 35 U.S.C. § 119(e) of each of U.S. provisional application 60/504,282 filed Sep. 17, 2003; U.S. provisional application 60/504,776 filed Sep. 17, 2003; U.S. provisional application 60/503,825 filed Sep. 22, 2003; U.S. provisional application 60/537,581 filed Jan. 20, 2004; U.S. provisional application 60/537,788 filed Jan. 20, 2004; U.S. provisional application 60/537,795 filed Jan. 20, 2004; and U.S. provisional application 60/584,622 filed Jun. 29, 2004. U.S. application Ser. No. 11/168,131 and this application also claim benefit under 35 U.S.C. § 119(e) of each of U.S. Provisional Applications 60/584,622 filed Jun. 29, 2004; 60/584,592 filed Jun. 29, 2004; 60/584,532 filed Jun. 29, 2004; 60/584,742 filed Jun. 29, 2004; 60/584,578 filed Jun. 29, 2004; and 60/678,916 filed May 6, 2005. U.S. application Ser. Nos. 11/168,131 and 11/039,655 and this application, also claim benefit of each of U.S. Provisional Applications 60/537,581 filed Jan. 20, 2004; 60/537,795 filed Jan. 20, 2004; 60/537,788 filed Jan. 20, 2004; and 60/584,622 filed Jun. 29, 2004.

Each of these applications is incorporated herein by reference as though fully rewritten herein.

TECHNICAL FIELD

This invention relates to automated banking machines. Specifically, the exemplary form of the invention relates to an automated banking machine which delivers and receives various types of sheet materials.

BACKGROUND ART

Automated banking machines are known in the prior art. A common type of automated banking machine is an automated teller machine (ATM). ATMs may be used by individuals to receive cash from their accounts, to pay bills, to transfer cash between accounts, and to make deposits. Certain ATMs also enable customers to deposit checks, money orders, travelers checks, or other instruments. For purposes of this disclosure an automated banking machine or ATM shall be deemed to encompass any device or system that carries out transactions including transfers of value.

DISCLOSURE OF INVENTION

It is an object of an exemplary embodiment to provide an automated banking machine.

It is a further object of an exemplary embodiment to provide an automated banking machine which has a simpler customer interface.

It is a further object of an exemplary embodiment to provide an automated banking machine which has a single opening for receiving and providing various types of sheets and documents.

It is a further object of an exemplary embodiment to provide an automated banking machine which performs a plurality of banking transaction functions and which has a compact physical size.

It is a further object of an exemplary embodiment to provide an automated banking machine that may be more readily configured to provide different banking functions.

It is a further object of an exemplary embodiment to provide an automated banking machine that is economical to manufacture and operate.

It is a further object of an exemplary embodiment to provide an automated banking machine that accepts and delivers various types of documents.

It is a further object of an exemplary embodiment to provide an automated banking machine that is convenient to operate and which can be operated in numerous types of systems.

It is a further object of an exemplary embodiment to provide methods for operation of an automated banking machine.

Further objects of exemplary embodiments will be made apparent in the following Best Modes for Carrying Out Invention and the appended claims.

The foregoing objects are accomplished in an exemplary embodiment by an automated banking machine having a transport which moves sheets or stacks of sheets along a first transport path. The first transport path extends from a user accessible opening on an interface of the machine. The machine also includes an internal second transport path for transporting sheets. The second transport path meets the first transport path at an intersection. A sheet directing apparatus is positioned adjacent to the intersection. The machine further includes at least one sheet dispensing device and at least one sheet accepting device for dispensing and receiving sheets, respectively. The sheet dispensing and receiving devices are in operative connection with either the first or second transport paths.

In operation of the exemplary machine a stack of sheets which may include various types of documents is received from a user is moved from the opening along the first transport path. As the stack passes the intersection the sheet directing apparatus is selectively operative to separate a sheet from the stack and direct the sheet into the second transport path. Once in the second transport path the separated sheet may be handled individually for processing or storage in the machine. Passing the stack through the intersection enables selectively removing sheets from the stack in response to operation of the sheet directing apparatus.

Sheets dispensed or otherwise held in the exemplary machine are enabled to be assembled into a stack by moving a sheet in the first transport path. A sheet in the second transport path is moved to the intersection in coordinated relation with the first sheet. The first and second sheets engage in aligned relation and form a stack in the first transport path as the sheets move through the intersection. Additional sheets are selectively added to the stack as the stack is thereafter again moved through the intersection while successive sheets are brought to the intersection through the second transport path. Various types of sheets are selectively assembled into the stack in the operation of the machine. Control circuitry operates the components of the machine to assemble the stack. Once the stack is assembled, it is delivered to the user by passing it along the first transport path to the user opening.

In exemplary embodiments data may be acquired and stored which is usable to determine the individual users who have provided and/or received particular sheets from the machine. This may enable the machine to determine the source or disposition of suspect notes for example. Alternatively or in addition, exemplary embodiments may limit the dispense of documents such as checks, money orders or cash from the machine to particular individuals to reduce the risk of money laundering or other illegal or fraudulent activity. In some exemplary embodiments the automated banking machine may accept deposits from a user which consist of both notes and checks. In such exemplary embodiments the machine operates to assure that the user's account is one to which deposits may be immediately posted before accepting such items for deposit and upon such a determination links all the deposited items provided by the user in the particular transaction session to assure that the items can be traced to the user. Other exemplary embodiments may include other or additional features.

BRIEF DESCRIPTION OF DRAWINGS

FIG. 24 is an exemplary output from a display of an automated banking machine.

FIG. 25 is an exemplary output from a display of an automated banking machine.

BEST MODES FOR CARRYING OUT INVENTION

Figure 1:
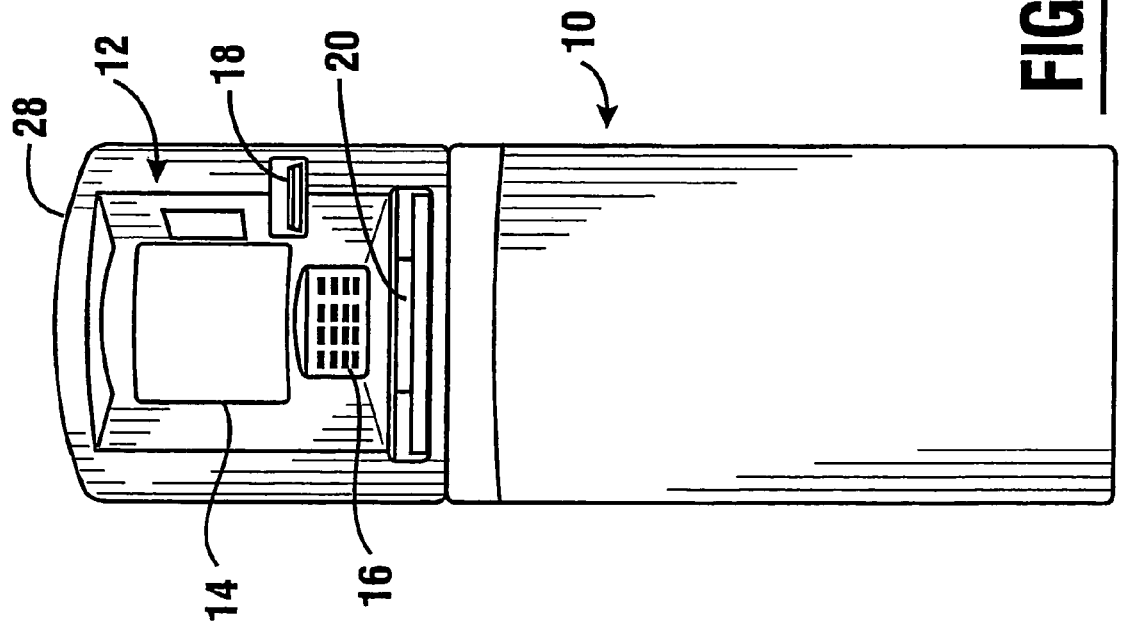
FIG. 1 is a front plan view of an exemplary automated banking machine.

Referring now to the drawings, and particularly to FIG. 1, there is shown therein an automated banking machine generally indicated 10. Machine 10 is an ATM. However, other embodiments of the invention may be other types of automated banking machines. ATM 10 includes a user or customer interface generally indicated 12. Customer interface 12 includes a touch screen 14. Touch screen 14 is of a type known in the prior art which serves as both an input device and an output device. The touch screen enables outputs through the display which is alternatively referred to herein as a screen, and enables customers to provide inputs by placing a finger adjacent to areas of the screen. Of course in other embodiments other types of displays may be used.

Customer interface 12 further includes a keypad 16. Keypad 16 includes a plurality of buttons which may be actuated by a customer to provide inputs to the machine. Customer interface 12 further includes a card reader slot 18. Card slot 18 is used to input a card with encoded data thereon that is usable to identify the customer and/or the customer's account information. Card slot 18 is connected to a card reader for reading data encoded on the card. Other exemplary embodiments may include types of input devices other than a card reader and/or a keypad. Some embodiments may include input devices such as biometric readers that may be operative to receive customer identifying inputs such as fingerprints, iris scans, retina scans, face topography data, voice data or other inputs that provide data that is usable to identify a user. An example of an ATM that uses biometric input devices and other types of input devices is shown in U.S. Pat. No. 6,023,688 the disclosure of which is incorporated herein by reference.

Customer interface 12 further includes an opening 20. Opening 20 as later explained, is used to receive stacks of sheets or documents from a customer operating machine 10. Opening 20 is also used to deliver stacks of documents to customers operating the machine. Although opening 20 is shown exposed in FIG. 1, it should be understood that in other embodiments it may be selectively covered by a movable gate or similar closure structure. It should be understood that these features of the described ATM user interface are exemplary and in other embodiments the user interface may include different components and/or features.

Figure 2:
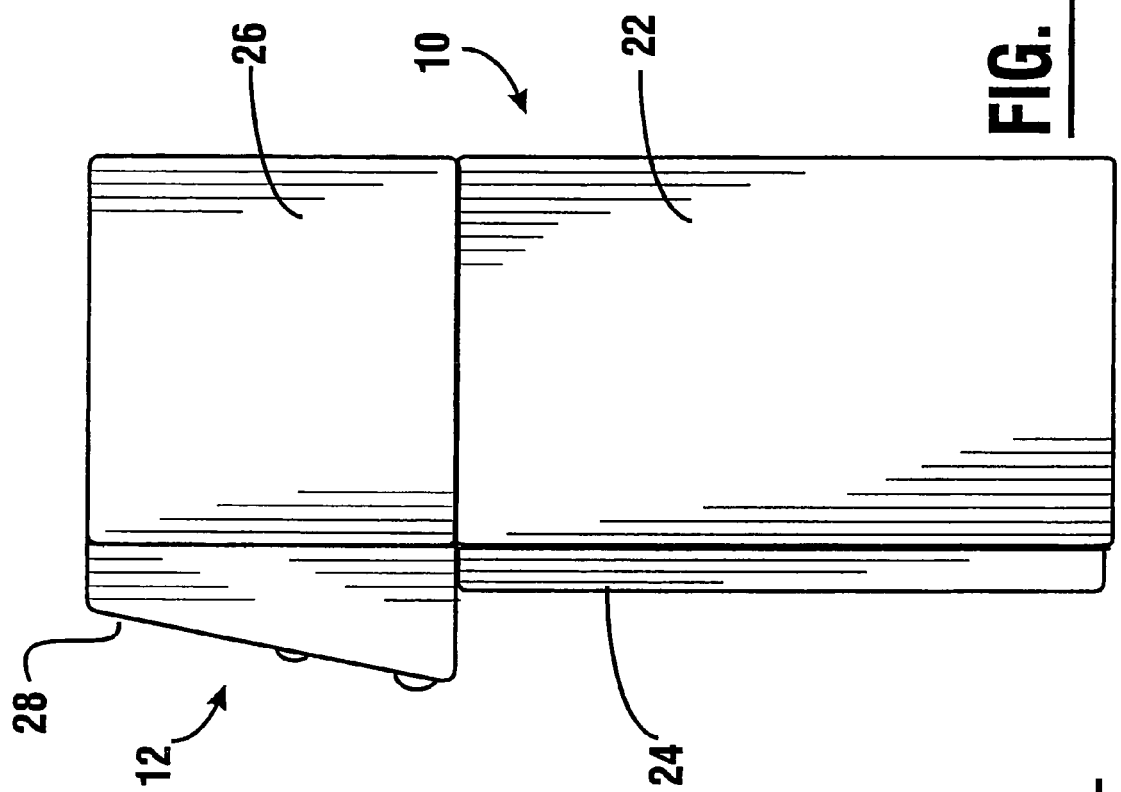
FIG. 2 is a left side view of the automated banking machine shown in FIG. 1.

As shown in FIG. 2 exemplary machine 10 has a generally divided body structure which includes a chest portion 22. Chest portion 22 in the exemplary embodiment is preferably a secure chest and is used for holding items of value such as currency or deposits. Chest portion 22 has a door 24 which can be selectively opened to gain access to the interior of the chest portion. Door 24 preferably includes a combination lock or other locking mechanism (not shown) which prevents the chest portion from being opened by unauthorized persons.

Machine 10 further includes an upper enclosure portion 26. The upper enclosure portion has components of the customer interface 12 thereon. The customer interface portion 12 includes a fascia 28. Fascia 28 is preferably movably mounted on the upper enclosure portion 26 and may be selectively opened to gain access to components housed in the upper enclosure portion. A locking mechanism (not shown) is preferably included in the upper enclosure portion of the exemplary embodiment for preventing unauthorized persons from gaining access to the interior thereof.

Figure 3:
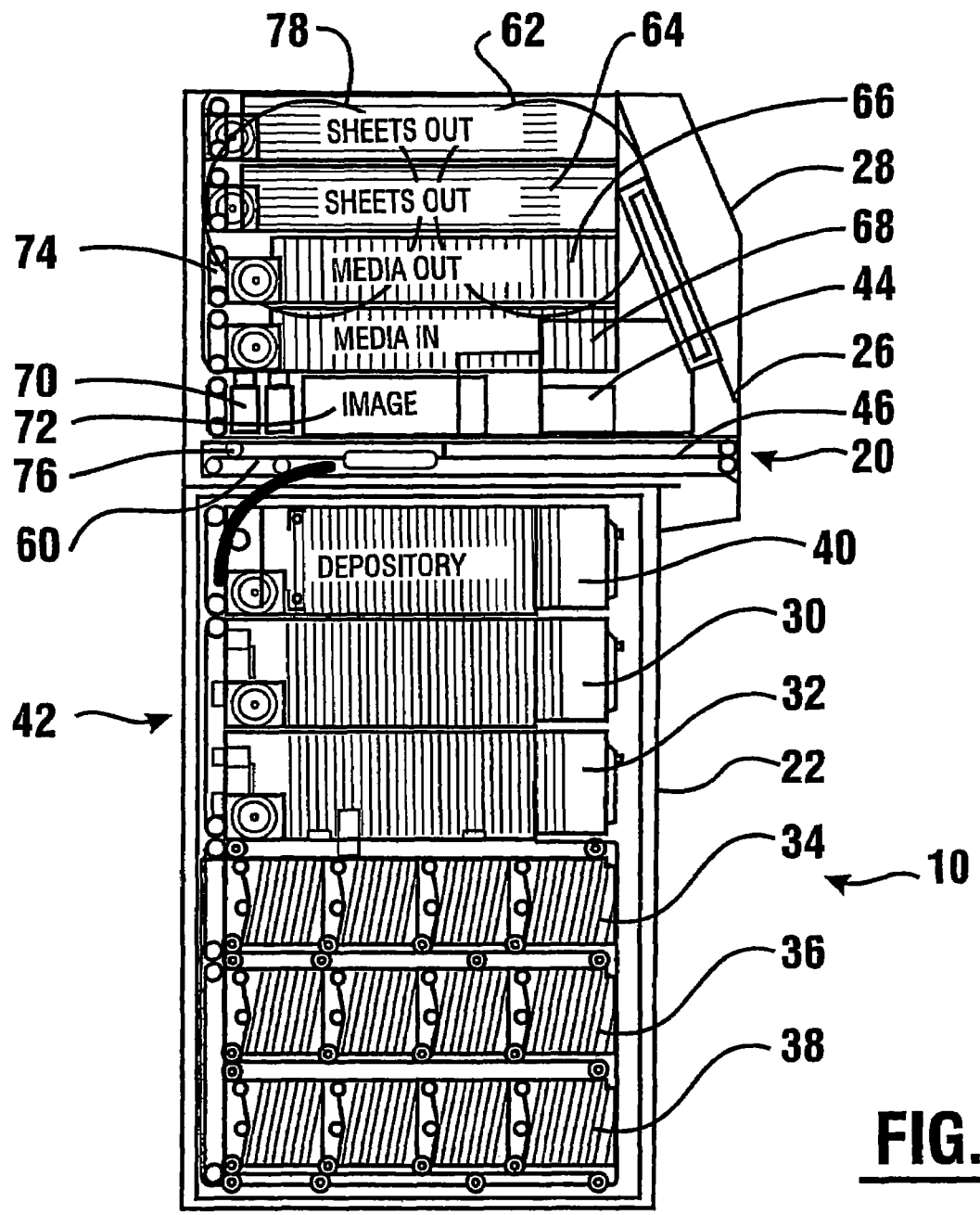
FIG. 3 is a schematic cross sectional view of the automated banking machine shown in FIG. 1.

As shown in FIG. 3 machine 10 includes a plurality of devices for carrying out banking transactions. It should be understood that the devices discussed hereafter are exemplary and that additional or different devices may be included in other embodiments of the invention.

The interior of ATM 10 is schematically shown in FIG. 3. The exemplary ATM includes devices for handling sheets such as notes (which are alternatively referred to herein as currency bills) and other documents. ATM 10 includes sheet dispensing devices, document producing devices and sheet receiving devices. Among the sheet dispensing devices are currency dispensers 30 and 32. Currency dispensers 30 and 32 may be of the type shown in U.S. Pat. No. 4,494,747, the disclosure of which is incorporated herein, which selectively dispense sheets one at a time in response to control signals. Currency dispensers 30 and 32 may include removable sheet holding containers or canisters which include indicia thereon. The canisters may be interchangeable and of the type shown in U.S. Pat. No. 4,871,085, the disclosure of which is incorporated herein. The indicia on the sheet holding canisters may be indicative of the type and/or properties of sheets held therein (i.e. currency type and denomination) and the indicia is read by a reading apparatus when the canister is installed in the machine.

The exemplary ATM may operate in response to the indicia on the canisters to adjust the operation of the dispensers to conform to the canister contents and position. In the exemplary embodiment the sheet holding canisters and other devices, may include indicia of the type shown in U.S. Pat. No. 4,871,085. The information represented by the indicia is read by the reading apparatus and the resulting signals transmitted to the machine control circuitry. The control circuitry adjusts operation of the sheet dispensing and receiving devices in response to the signals to conform to the type and character of the sheets held in the various canisters.

In the exemplary embodiment of machine 10 shown in FIG. 3, the machine preferably includes a note handling mechanism including sheet receiving and delivering devices 34, 36 and 38. The exemplary sheet receiving and delivering devices may be of the type shown in U.S. Pat. No. 6,331,000, the disclosure of which is incorporated herein by reference. The sheet delivering and receiving devices may enable receiving and storing sheets in selected compartments as well as selectively delivering sheets from the various compartments. As can be appreciated from the incorporated disclosure, some of the note handling mechanisms may receive and store notes only, others may dispense notes only and some may both receive and dispense notes. Other mechanisms may process sheets of types other than notes. This may include check and sheet processing devices of the types shown in the incorporated disclosures. Machine 10 further includes an envelope depository schematically indicated 40. Depository 40 is a device configured to accept and hold relatively thick sheet-like deposit envelopes deposited by customers in the machine.

Depository 40, currency dispensers 30 and 32 and sheet receiving and delivering devices 34, 36 and 38 are all positioned within the chest portion 22 of the machine 10. In the exemplary embodiment, the sheet dispensing and receiving devices, except for the depository, in the exemplary embodiment may be interchangeably positioned in the machine. The control circuitry adjusts operation of the machine accordingly based on the device positions and the indicia on the canisters or devices.

Each of the currency dispensers 30 and 32, sheet receiving and delivering devices 34, 36 and 38, and the depository 40 are in communication with a sheet transport path generally indicated 42. Sheet transport path 42 comprises a plurality of sheet transports which are aligned and in operative connection through a rear area of the chest portion. Sheet transport path 42 may include one or more sheet transports of the type shown in U.S. Pat. No. 5,240,638, the disclosure of which is incorporated herein. Each of the depository 40, currency dispensers 30 and 32 and sheet receiving and delivering devices 34, 36 and 38 are in operative connection with the sheet transport path 42, and are enabled to deliver sheets to and/or receive sheets from the sheet transport path 42.

Sheet transport path 42 extends through an opening (not shown) in the chest portion 22 of the ATM chest. Wiring that connects components located in the chest portion with components in the upper enclosure portion 26 also extends through an opening in the chest portion and is connected to control circuitry, schematically indicated 44. The control circuitry 44 preferably includes at least one processor in operative connection with at least one memory or data store, and is operative to carry out programmed instructions based on data stored in the memory. The control circuitry in the exemplary embodiment operates the machine to carry out the operations hereinafter described. The control circuitry is alternatively referred to herein as a processor and/or a computer.

Upper enclosure portion 26 includes the fascia 28 and the customer accessible opening 20. A first transport path generally indicated 46 extends inside the machine from opening 20. First transport path 46 of the exemplary embodiment includes an interwoven belt type transport of the type shown in U.S. Pat. No. 5,797,599, the disclosure of which is incorporated by reference. A transport of this type is schematically shown in FIG. 5 and is generally indicated 48.

Transport 48 includes a plurality of spaced first rolls 50 and a plurality of intermediate spaced second rolls 52. Rolls 50 and 52, which are preferably crowned rolls, support elastomeric belts thereon. First rolls 50 support first belts 54 and second rolls 52 support second belts 56. Belts 54 and 56 extend longitudinally in the transport 48.

Figure 5:
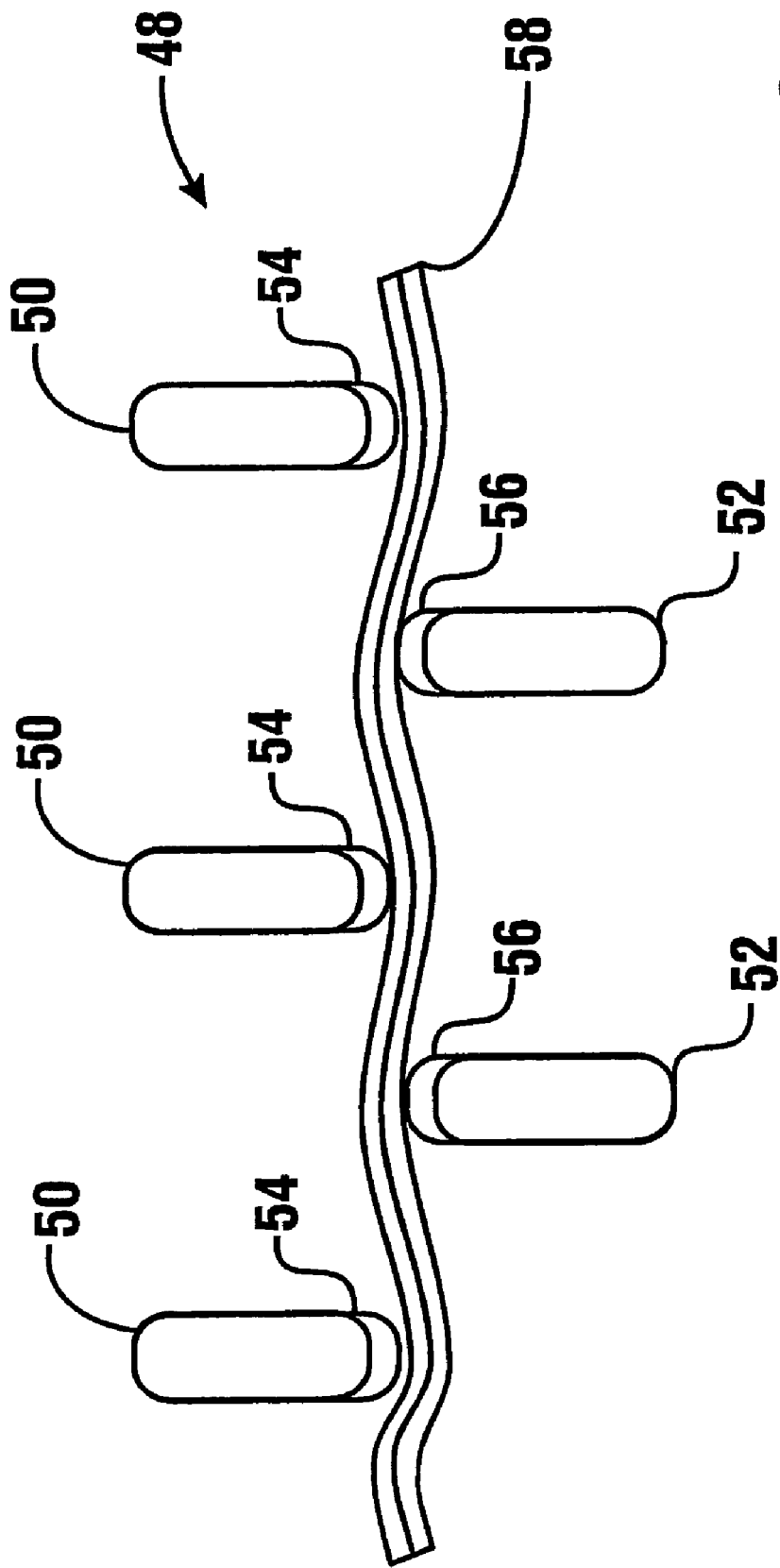
FIG. 5 is a transverse cross sectional view of a transport used in the automated banking machine.

A stack of sheets schematically represented by sheet 58 in FIG. 5, move in engaged relation with belts 54 and 56 in the transport as described in the incorporated patent disclosure. The configuration of transport 48 enables transporting stacks having varied numbers and types of sheets, as well as transporting passbooks and other forms of stacked sheets. The transport of the exemplary embodiment is useful because of its ability to transport sheets of various types, having varied thicknesses and frictional properties while minimizing skewing.

Referring again to FIG. 3, first transport path 46 intersects with transport path 42 at a first intersection, generally indicated 60. As hereinafter explained the exemplary embodiment comprises a separating mechanism that separates sheets individually from a stack and a stack assembly mechanism that produces a stack of documents. In the exemplary embodiment, sheets are selectively stacked and unstacked while moving through first intersection 60 to enable processing of sheets within the machine 10.

Upper enclosure portion 26 also includes various sheet producing, dispensing and/or receiving devices. These dispensing and receiving devices may include dispensers or devices for receiving or dispensing sheets similar to those shown in U.S. Pat. No. 4,494,747 or U.S. Pat. No. 6,331,000, and may include removable canisters for holding sheets therein. Such removable canisters may also include indicia of the type described in U.S. Pat. No. 4,871,085, which are read by apparatus within the machine. The control circuitry may be operative to control the operation of the machine in response to the indicia.

Devices 62 and 64 may serve as part of document producing device and may hold sheets such as blank receipt or statement forms. Alternatively, one of such canisters may hold blank instruments which must be completed, such as scrip forms, money orders or travelers checks. A further sheet dispensing device 66 may dispense documents that need to be completed before dispense documents that need to be completed before dispense such as bank checks or documents that are dispensed without further processing such as plates of stamps.

A sheet receiving device 68 is also preferably included in the upper enclosure portion. Sheet receiving device 68 may be used for holding sheets such as checks or other instruments, which have been input by a customer to the machine and which have been imaged and/or canceled through processing in the machine.

The exemplary upper enclosure portion further includes at least one printing device schematically indicated 70. Printing device 70 may be used for selectively printing on sheets under control of the control circuitry. An imaging device schematically indicated 72 is also included. Imaging device 72 is preferably of the type which enables reading and generating an electronic image of a document, such as that shown in U.S. Pat. Nos. 5,534,682, 5,923,413 or U.S. Patent Application Ser. No. 60/678,916, the disclosures of each of which are incorporated as if fully rewritten herein. In some embodiments an imaging device may operate in conjunction with the control circuitry to produce signals which comprise image data, which image data corresponds to an electronic representation of an image of a check or other instrument. The electronic representation may include all or selected portions of one or both sides of the sheet. For example in some situations it may be suitable to obtain an electronic image of alphabetic, numerical and/or other symbols or features on the check. For example such data may be analyzed using character recognition software such as software commercially available from Check Solutions Inc., Carreker, Parascript, A2ia or other companies to determine the maker, amount and/or other data pertinent to the check for purposes of receiving and/or cashing the check.

In some embodiments printing devices or other devices may also serve as part of a cancellation device. Such a cancellation device may serve to print or otherwise mark checks or other documents received by the machine. For example, the machine may mark as cancelled checks which are received and processed by the ATM. In some embodiments such checks or documents may be marked through operation of the cancellation device and then stored in a check storage location in the machine. In other embodiments the cancellation device after the document has been imaged, may mark the document as cancelled and return the cancelled document to the user of the machine. In some embodiments one or more such cancelled documents may be assembled in a stack in a manner hereafter discussed, when returned to a user. Cancelled documents may also be returned in an assembled stack with other documents such as a receipt for the transaction and/or notes dispensed by the ATM as a result of cashing the check. The control circuitry may also operate to store data corresponding to the check and the identity of the user of the ATM providing the check to the machine in one or more data store for purposes of record keeping. For example the data store may store data corresponding to the check with the data that corresponds to a user's account number, biometric data, photograph or other data usable to identify a user. Of course these approaches are exemplary and other approaches may be used.

In some embodiments the control circuitry may operate to check the user identity data before cashing one or more checks. The control circuitry may also be programmed to limit the risk of check cashing by unauthorized persons and/or to reduce the risk of money laundering. For example before cashing a check the control circuitry may operate to compare data corresponding to the characters identifying the payee indicated on the check to other input data corresponding to the user of the machine and/or to the characters on the check comprising the endorsement. If the payee, user and/or endorsement data does not correspond, the control circuitry may operate so that the check is not accepted or cashed. Further the control circuitry may operate to determine the amount and/or nature of checks the particular user has presented at the ATM and/or within a prior time period. The ATM may also operate to communicate with other computers in a network to determine the amount or nature of checks presented by the user at other ATMs. If the user's check presenting activities fall outside certain established programmed parameters, such that the user's activities may be indicative of theft of the check or money laundering, for example, the ATM may refuse the transaction.

In the alternative and/or in addition a user presenting a check may be required by the control circuitry to provide at least one biometric input. This may be done even in circumstances where the user may be identifiable by data on a card or another manner. The biometric identification data may be compared to stored data and used to evaluate the check cashing activities of this particular user. A determination may be made by the control circuitry or by a remote computer to determine if the activities fall outside the established parameters such that the current transaction is suspicious and not permitted. In this way a user with multiple cards and/or multiple identities may be prevented from conducting transactions that might be suspicious in terms of theft or money laundering. Of course some embodiments may also operate to cross check biometric data with data on a debit or credit card or other item or other device presented by the user to the ATM to provide greater assurance as to the identity of the user. Of course in other embodiments other approaches may be used.

The exemplary handling devices 62, 64 and 66, as well as the sheet receiving device 68, of the ATM are all in communication with one or more transports. These transports may be of the type shown in U.S. Pat. No. 5,342,165, the disclosure of which is incorporated herein, or other suitable sheet transport devices. The sheet transport devices form a sheet transport path 74. Sheet transport path 74 extends to transport path 46 and meets transport path 46 at a second intersection 76.

The upper enclosure portion may also include additional or other devices. Such devices may include a journal printer as schematically indicated by rolls 78. The journal printer is used to make a paper record of transactions conducted at machine 10. Electronic journals may also be made through operation of the control circuitry and stored in memory. Other devices which may be included in the machine are other types of document producing devices, audio output devices, customer sensors, cameras and recorders, biometric sensing devices and other apparatus suitable for use in the operation of the particular type of automated banking machine.

Figure 4:
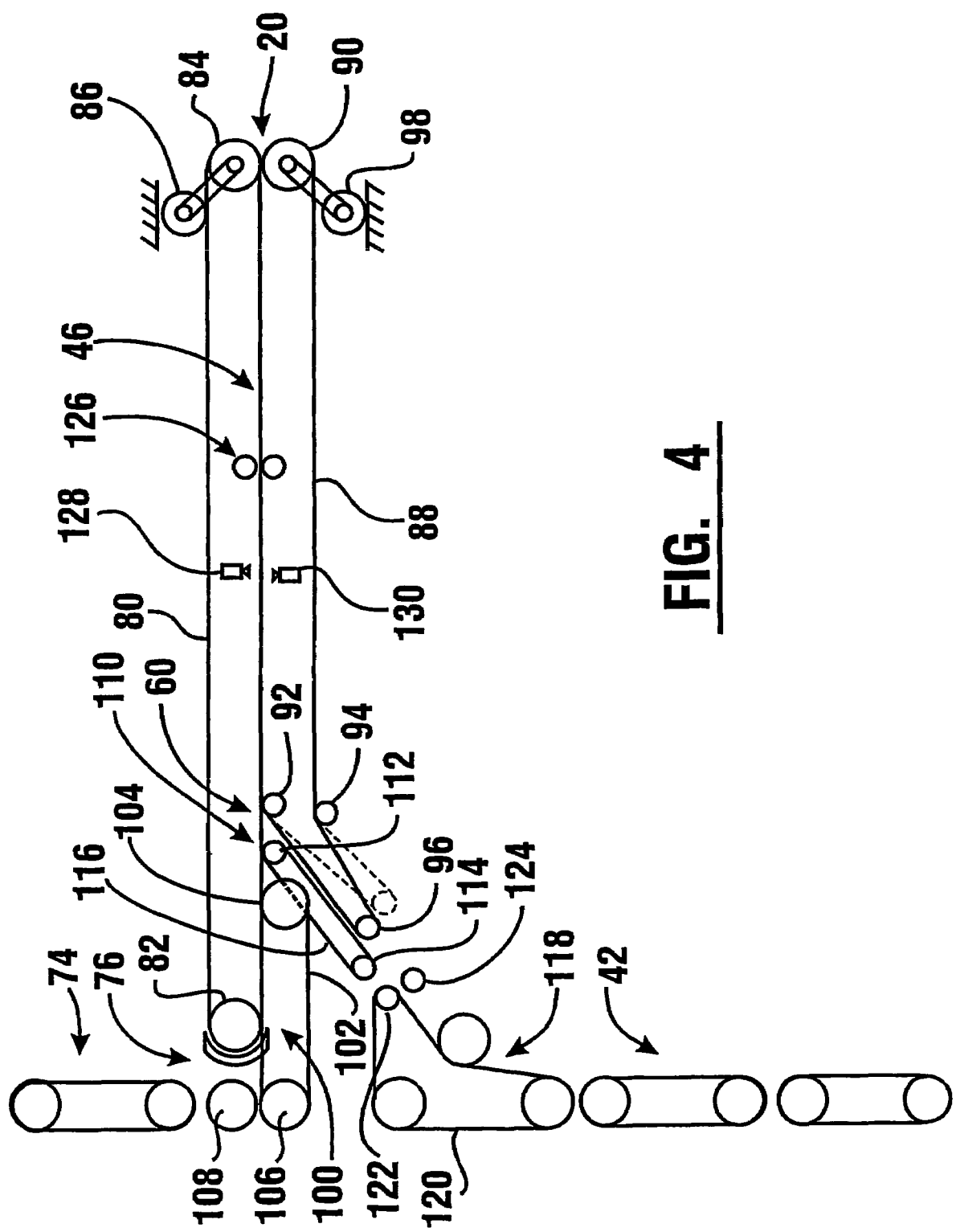
FIG. 4 is a side schematic view of a first transport path and a second transport path in the automated banking machine.

Transport paths 42, 46 and 74 of the exemplary machine are shown in greater detail in FIG. 4. Transport path 46, which includes one or more transports of the interwoven belt type shown in FIG. 5. The transport path has therein a plurality of first belts 80 which extend between first rolls 82 and 84. First rolls 82 and 84 are selectively driven by a reversible drive, schematically indicated 86.

Second belts 88 extend between a second roll 90 and rolls 92, 94 and 96. Second belts 88 are driven by a second reversible drive schematically indicated 98. As shown in FIG. 4, roll 96 is selectively movable for purposes which are later explained. Of course it should be understood that the belts and rolls shown in the first transport path 46 are actually a plurality of spaced belts and rolls of the type shown in FIG. 5.

First transport path 46 further includes a further transport section 100. Transport section 100 is similar to the transport shown in FIG. 5 and includes a plurality of third belts 102 journaled on spaced rolls 104 and 106.

Rolls 106 have positioned adjacent thereto a plurality of holding rolls 108. Rolls 108 are positioned in spaced axial intermediate relation of third belts 102. This configuration imparts a wave configuration to sheets and stacks of sheets in a manner comparable to that imparted to sheets held by transport 48 as shown in FIG. 5. Holding rolls 108 and transport section 100 are independently driven by reversible drives (not shown) under the control of the control circuitry 44.

Adjacent to first intersection 60, where sheet path 42 meets sheet path 46, is a sheet directing apparatus generally indicated 110. Sheet directing apparatus 110 includes sheet engaging rolls 112 and further rolls 114. Rolls 112 and 114 have resilient belts 116 mounted thereon. It should be understood that rolls 112 and 114 are driven by one or more independent reversible drives (not shown) under control of the control circuitry 44. It should be understood that rolls 112 and 114 and belts 116 in FIG. 4, represent a plurality of such belts and rolls which are preferably disposed in intermediate relation between the lower flights of first belts 80.

Transport path 42 further includes transport 118 which is adjacent to depository 40. Transport 118 includes a plurality of rolls which drive belts 120 in response to a reversing drive (not shown). Rolls 122 which are engaged with belts 120, as well as rolls 124 which are independently driven by one or more reversible drives (not shown), are positioned in the sheet path 42 adjacent to rolls 114 and 96. The purpose of this configuration is later discussed in detail.

As schematically represented in FIG. 4 transport path 46 includes sensing devices. These sensing devices are in operative connection with the control circuitry 44, and operate to sense features of sheets and stacks of sheets in the sheet transport path. A thickness sensor schematically indicated 126 is preferably provided for sensing the thickness of sheets, stacks of sheets, or sheet like deposit envelopes that move along transport path 46. Indicia reading devices 128 and 130 are preferably operative to sense indicia on sheets and envelopes moving in the transport path. The sensing devices may include photo reflective devices, magnetic sensing devices or other appropriate devices for distinguishing currency, various types of negotiable instruments and deposit envelopes. For example in some embodiments the sensing devices in combination with the control circuitry in the machine may comprise a validating device for assessing the validity of notes or other documents. An example of such a validating device is shown in U.S. Pat. No. 5,923,413 the disclosure of which is incorporated herein. In some embodiments the validating device may additionally or alternatively be operative to identify individual notes. For example, the validating device may produce through algorithms one or more distinctive values that are generally uniquely associated with a particular note. In addition or in the alternative, the validating device may include character recognition capabilities which enable determination of the serial numbers or other unique characters associated with particular notes. This may enable some embodiments of the machine to store in correlated relation in at least one data store, data that uniquely identifies a note input to the ATM and the particular user who provided the note to the machine. This may enable the ATM to identify a particular suspect note and capture the information on the user who provided it to the machine. The particular type, position and capabilities of sensing devices and/or validating devices used in a particular machine will depend on the characteristics and types of documents which are intended to be processed by the machine.

Various sheet manipulating and processing operations performed by the exemplary automated banking machine of the described embodiment are now explained in detail with reference to FIGS. 6-21.

Figure 6:
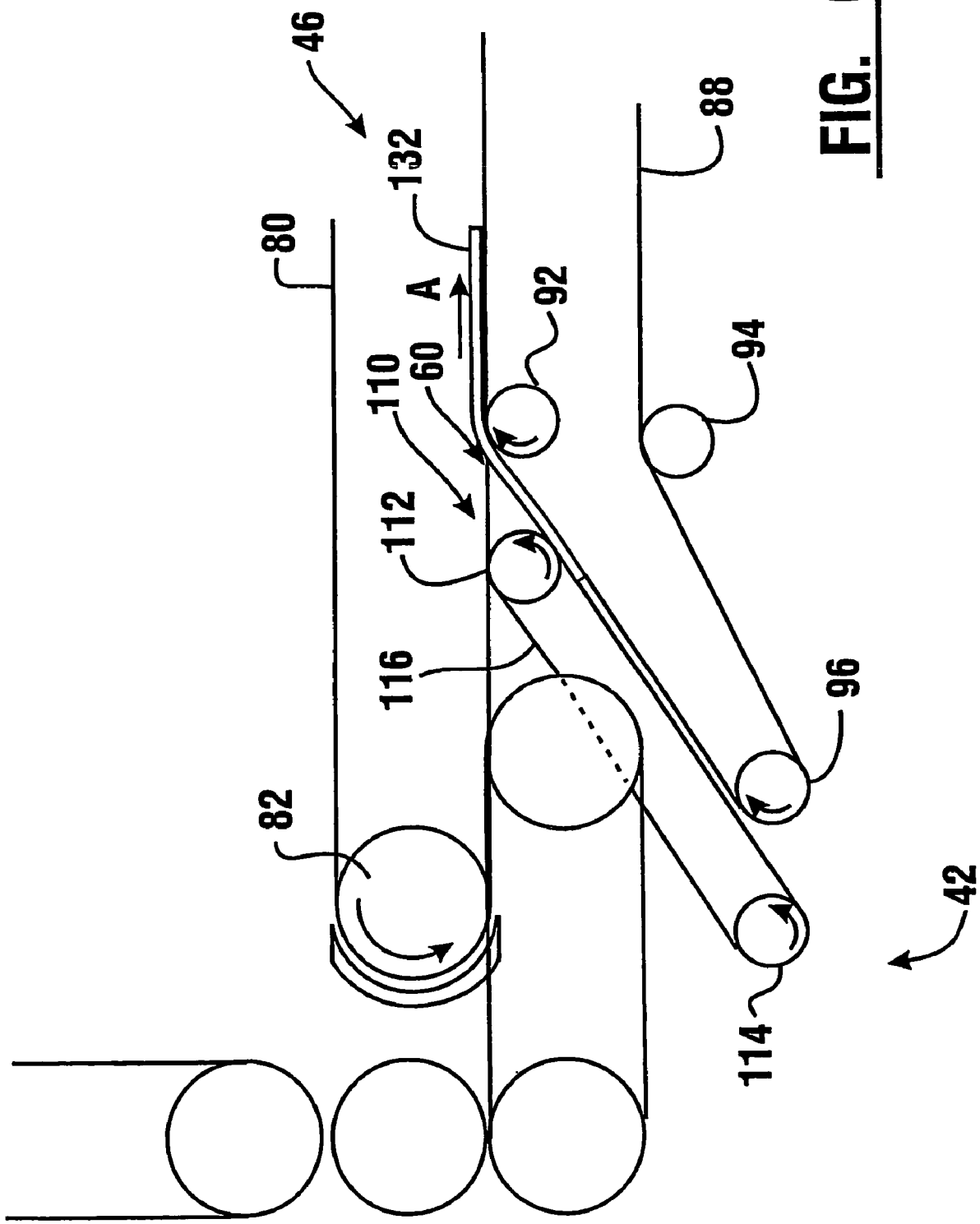
FIG. 6 is a schematic side view of a sheet moving from the second transport path to the first transport path through an intersection.

FIG. 6 shows a sheet 132 moving through the intersection 60 of the first sheet path 46 and sheet path 42. Sheet 132, prior to reaching the position shown in FIG. 6, may have been dispensed by one of the sheet dispensing devices positioned adjacent to transport path 42 and moved adjacent to the intersection by the transports which make up the transport path. As sheet 132 approaches the intersection it is engaged by belts 116 of the sheet directing apparatus 110, as well as belts 88. The control circuitry operates the drives which move the belts to work in cooperating relation to move the sheet toward the intersection. Once the sheet is passed through the intersection it is engaged between the lower flights of belt 80 and the upper flights of belts 88, and the sheet 132 is carried in the first direction indicated by Arrow A in FIG. 6. As will be appreciated from FIG. 4, Arrow A is in the direction of the customer opening 20 of the automated banking machine.

Figure 7:
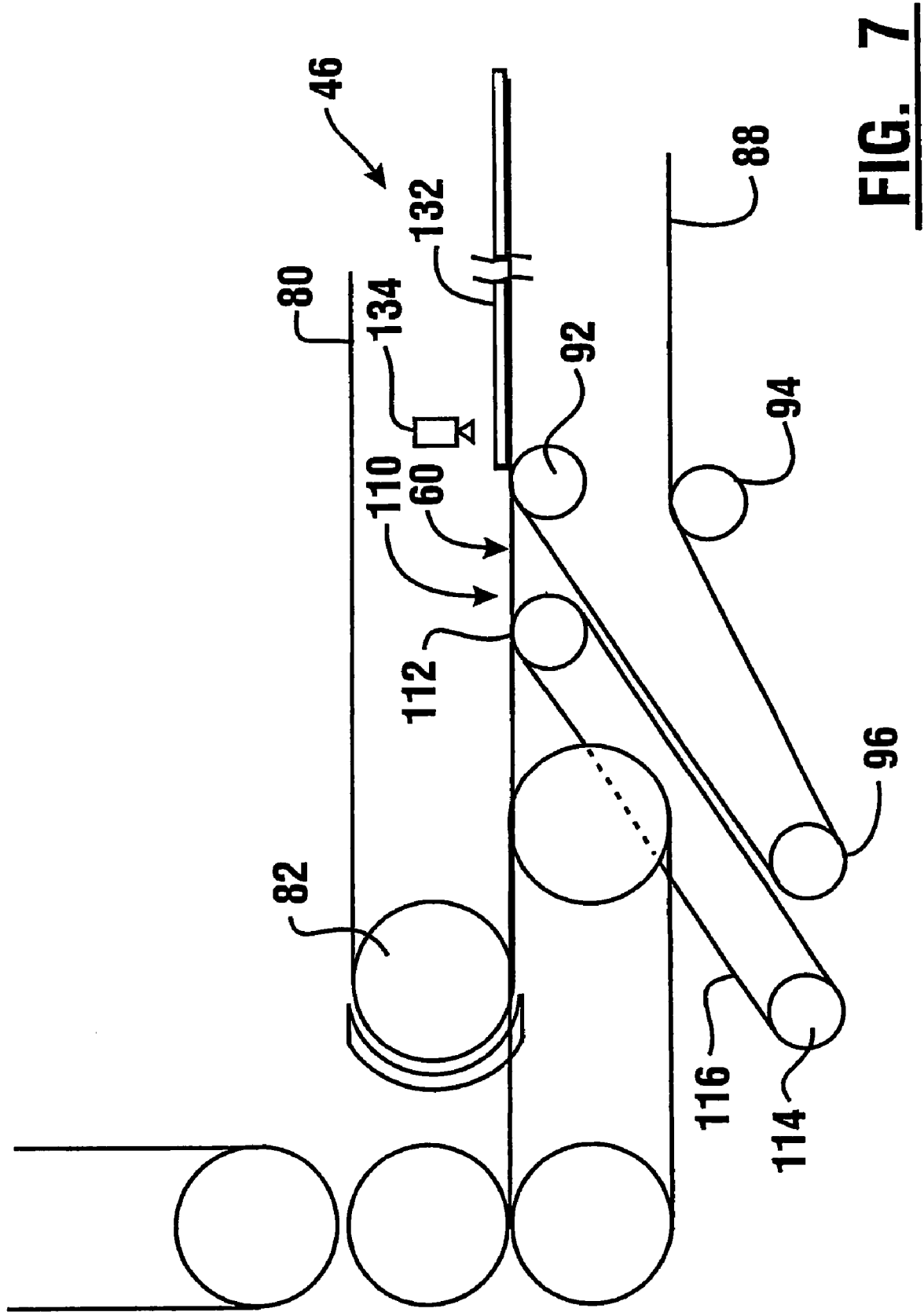
FIG. 7 is a view similar to FIG. 6 with the sheet moved into the first transport path from the intersection.

As shown in FIG. 7 in the mode of operation currently being described, the structures act as a stack assembly mechanism. Once sheet 132 is fully moved through the intersection in the first transport path 146, movement of the sheet in the first direction is stopped. This is accomplished by the control circuitry 44 operating the transport drives in accordance with its program logic stored in memory, and in response to customer inputs at the customer interface. A sensor schematically indicated 134 positioned in the first sheet path senses the position of the sheet. Sensor 134 is in operative connection with the control circuitry. Sensor 134 may be one of several types of sensors suitable for sensing the position of sheets, such as a photo reflective type sensor. Once sheet 132 is in the position shown in FIG. 7, belts 80 and 88 are stopped.

Figure 8:
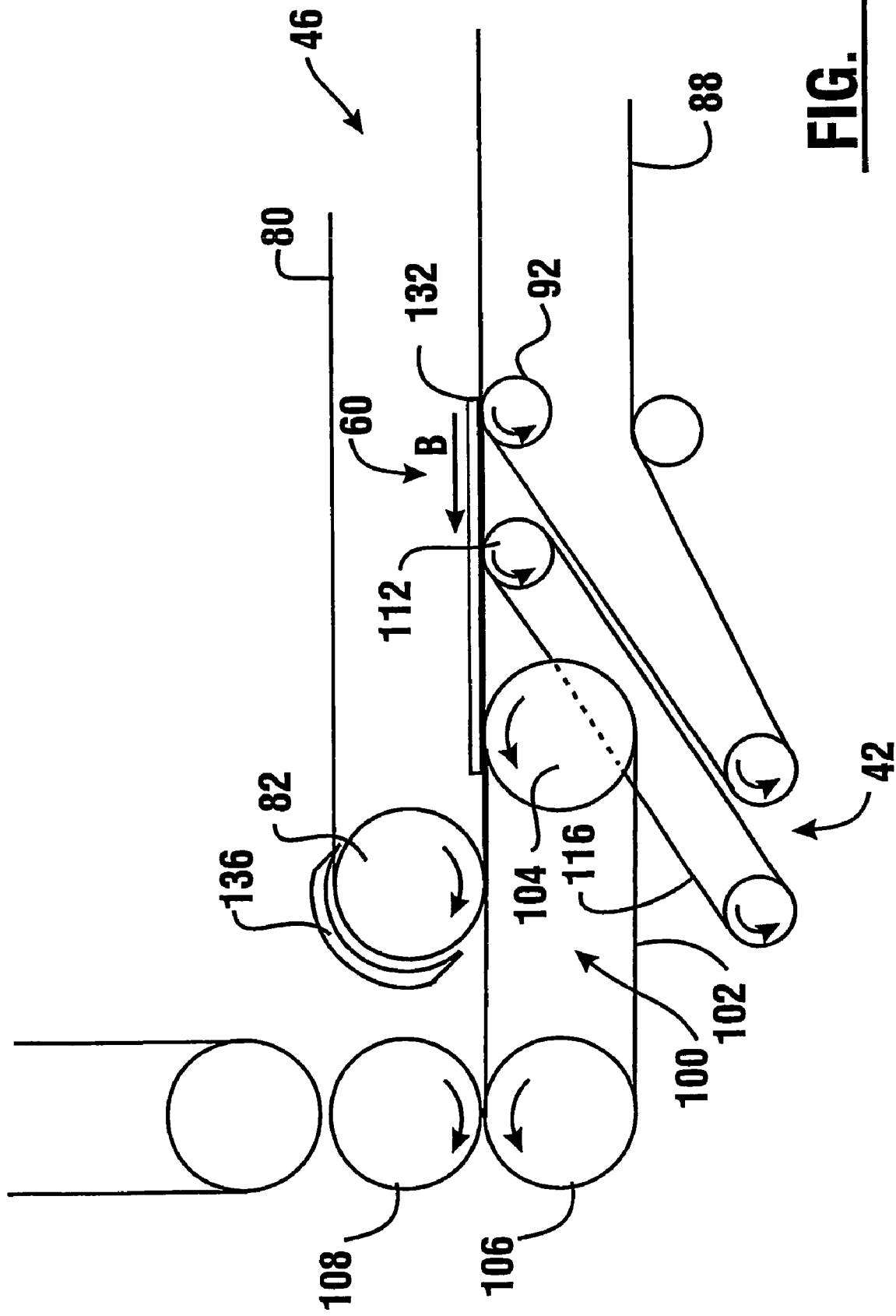
FIG. 8 is a schematic view similar to FIG. 7 with the sheet moving in an opposed direction through the intersection.

As shown in FIG. 8, the control circuitry now operates the components of the machine to move sheet 132 in a second opposed direction as indicated by Arrow B. To move sheet 132 through the intersection in the opposed direction, sheet engaging rolls 112 and belts 116 rotate to prevent sheet 132 from passing into the second sheet transport path 42. Transport section 100 is also operated by the control circuitry to engage sheet 132 and move it in the opposed direction. A sheet turnover member 136 later described in detail, is moved to enable sheet 132 to pass roll 82 in the first sheet path.

Figure 9:
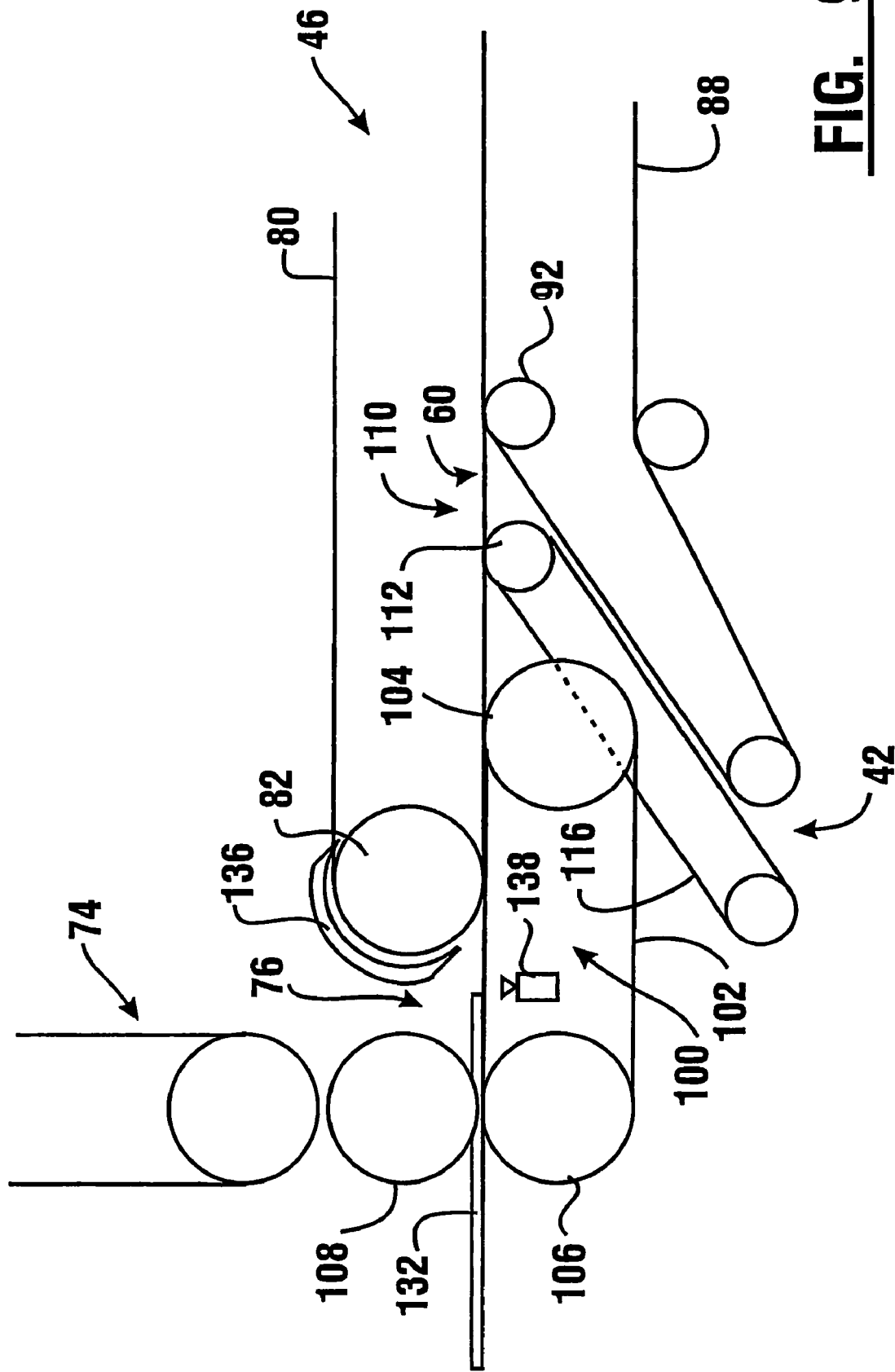
FIG. 9 is a schematic view similar to FIG. 8 with the sheet held in a holding device.

As shown in FIG. 9 sheet 132 is moved in the second direction until it is engaged between holding rolls 108 and transport section 100. A sensor which is schematically indicated 138 is positioned to sense that sheet 132 is positioned in the holding device provided by the combination of holding rolls 108 and transport section 100. Sensor 138 is operatively connected to the control circuitry which operates to stop further movement of sheet 132 in the second direction when it has reached the position shown. It should be noted that sheet 132 in this position is held adjacent to second intersection 76, which is the intersection of sheet path 74 and sheet path 46.

Figure 10:
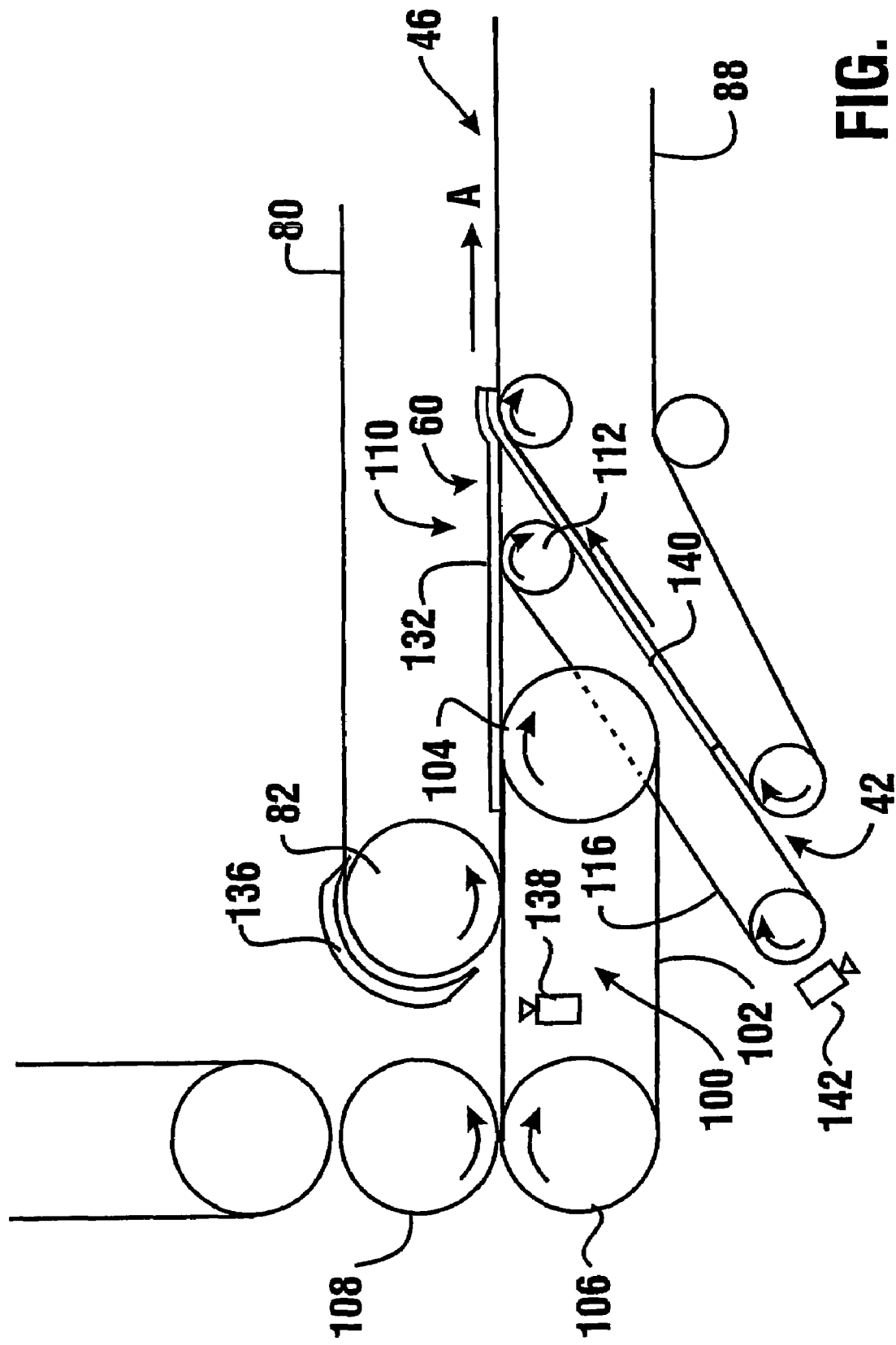
FIG. 10 is a view similar to FIG. 9 with the sheet moving in the intersection and engaging a second sheet being delivered through the second transport path, the second sheet engaging in aligned relation with the first sheet to form a stack.

The next step in the operation of the exemplary stack assembly mechanism is represented in FIG. 10. A further sheet 140 is moved in transport path 42 toward the intersection 60. Sheet 140 may be dispensed by one of the sheet dispensing devices, sheet producing devices or is otherwise in the path, and is moved toward the intersection. As sheet 140 moves adjacent to the intersection it is engaged by the belts 116 of sheet directing apparatus 110 as well as belts 88. Sheet 140 is also sensed by a sensor 142 in transport path 42. Sensor 142 is in operative connection with the control circuitry. The control circuitry operates to accurately coordinate the movement of the sheet 140 in engagement with the sheet directing apparatus 110 and belts 88.

As sheet 140 moves toward the intersection 60 the control circuitry operates to begin moving sheet 132 in the first direction along path 46 toward the intersection. The control circuitry coordinates the operation of the drives for the various components so that sheet 140 and sheet 132 pass through the intersection 60 in coordinated relation. As a result, sheets 132 and 140 engage in aligned, abutting relation so as to form a stack as they move through the intersection 60.

Figure 11:
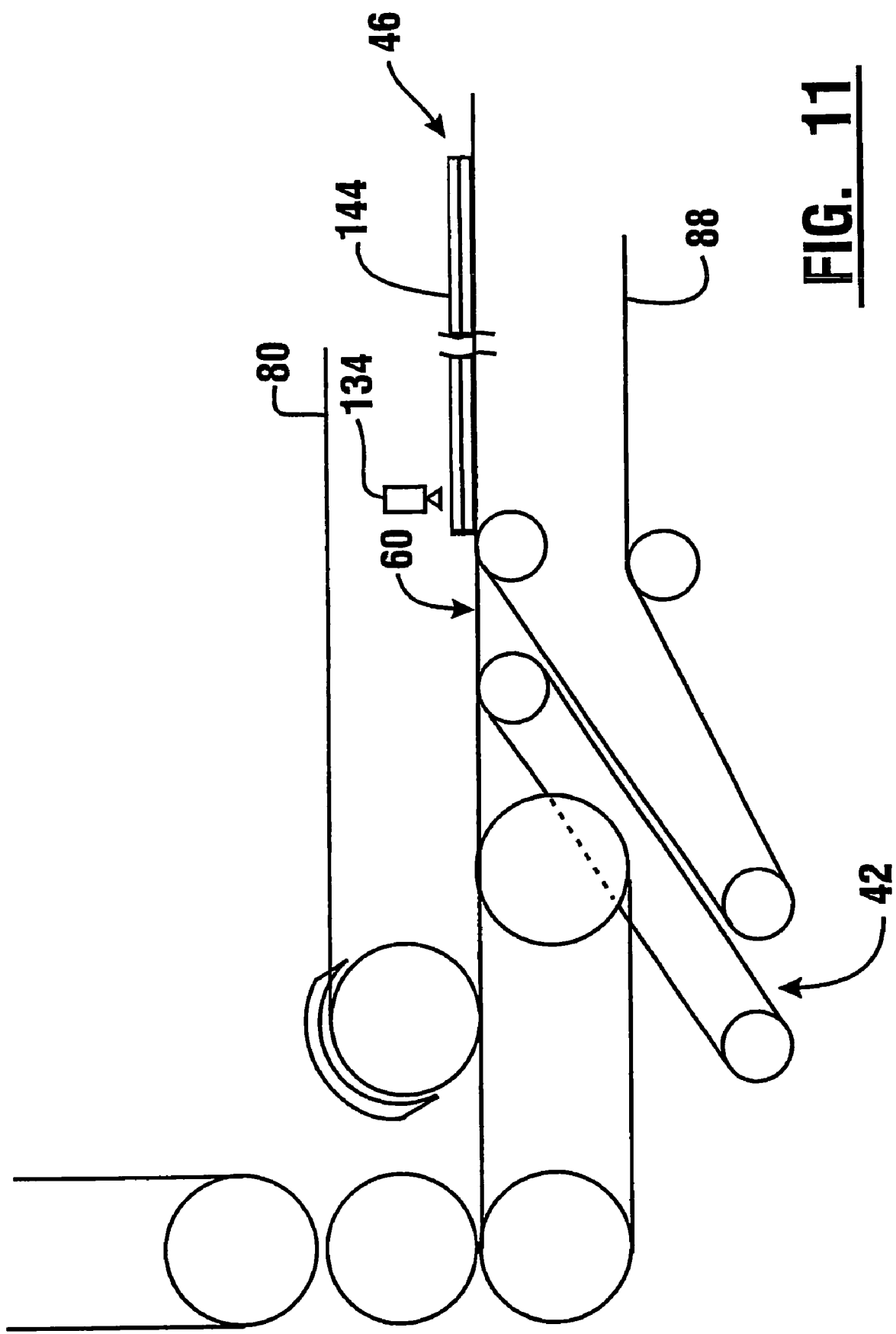
FIG. 11 is a schematic view similar to FIG. 10 in which the stacked pair of sheets have passed through the intersection.

As shown in FIG. 11 once sheets 140 and 132 have passed intersection 60 in the first direction, they are in a stack generally indicated 144. As schematically indicated in FIG. 11, in this mode of operation sensor 144 is operative to sense passage of the stack through the intersection and the control circuitry is operative to stop movement of the stack in the first direction in response to signals from the sensor. After sheets 132 and 140 have combined to form stack 144, additional sheets may be added to the stack. This is accomplished by moving the stack 144 in the second direction similar to that which is done with sheet 132 previously, as represented in FIG. 8. Stack 144 is moved to the position shown in FIG. 12 in which it is held by the holding device formed by holding rolls 108 and transport section 100. Thereafter, additional sheets may be added to the stack by passing sheets on transport path 42 and engaging such sheets in aligned relation with the stack in a manner similar to that represented in FIG. 10.

It will be appreciated that a stack comprising a significant number of generally aligned and abutting sheets may be formed in the manner described. Because the sheets are selectively dispensed from the dispensing devices and/or sheet producing devices adjacent to transport path 42, the sheets may be stacked in a desired order as determined by the control circuitry. For example, sheets which are currency notes may be stacked in order from highest to lowest denomination, or vice versa. Particular sheets may be placed in a desired location within the stack. Once the stack has been assembled in the desired manner by the control circuitry of the machine, it may be moved in first transport path 46 to the opening 20 so it may be taken by a customer.

Figure 12:
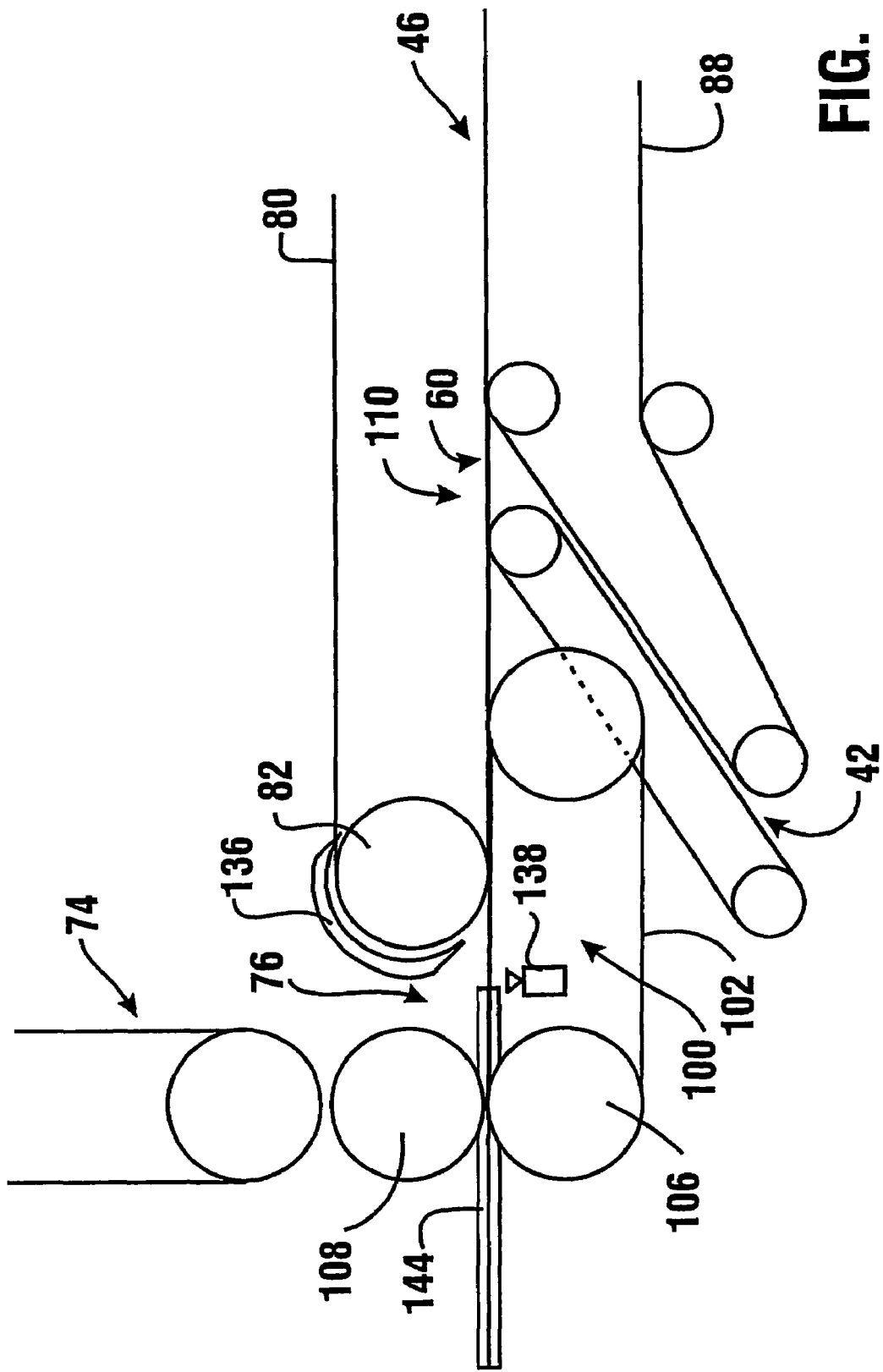
FIG. 12 is a schematic view similar to FIG. 11 in which the stacked sheets are held in the holding device.

It should also be noted that in the position of stack 144 shown in FIG. 12, the stack is positioned in the holding device formed by holding rolls 108 and transport section 100 adjacent to intersection 76. Intersection 76 is the intersection of transport path 46 and transport path 74. Transport path 74 extends to the devices housed in the upper enclosure portion 26 of machine 10.

Figure 16:
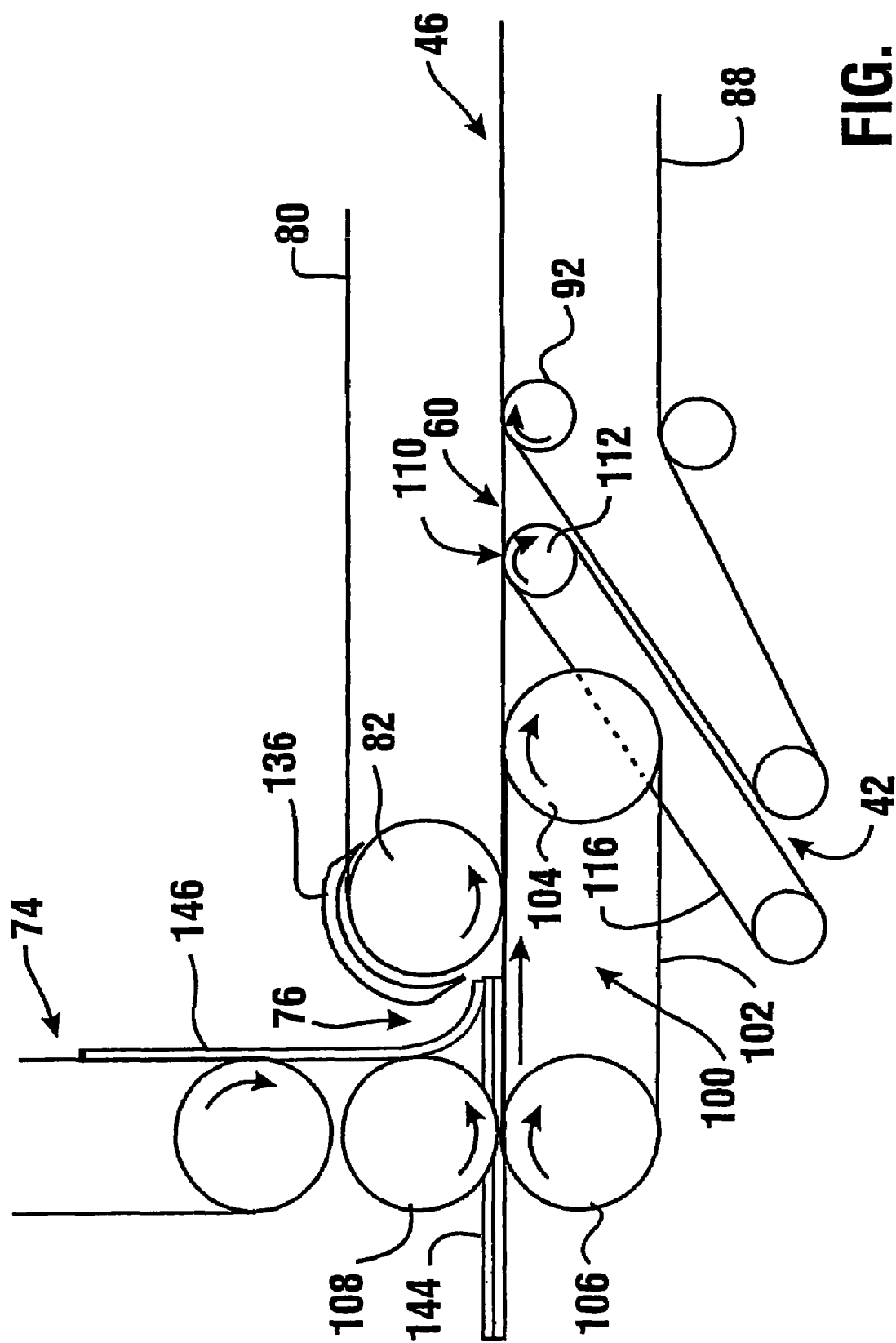
FIG. 16 is a schematic view showing a sheet passing through a second intersection between the first transport path and a third transport path.

As schematically represented in FIG. 16, a sheet 146 may be moved from one of the devices adjacent to sheet path 74 to engage the stack 144 at intersection 76 as the stack moves in the first direction. This enables adding sheets to the stack which are housed in the sheet dispensing devices and/or document producing devices adjacent to sheet path 74. The stack formed by the addition of sheets from sheet path 74 may be moved through sheet path 46 to the customer.

It will be understood that sheets from sheet path 74 may be delivered individually through intersection 76 into sheet path 46, and may thereafter be added to a stack formed at intersection 60 in a manner similar to that previously described. It should also be understood that sheet path 74 includes appropriate sensors that are operatively connected to the control circuitry. The control circuitry operates so that sheets from the sheet path 74 may be added to a stack in engaged, aligned relation with the other sheets in the stack as the sheets pass through intersection 76. As a result the associated structures operate as a further stack assembly mechanism.

Figure 15:
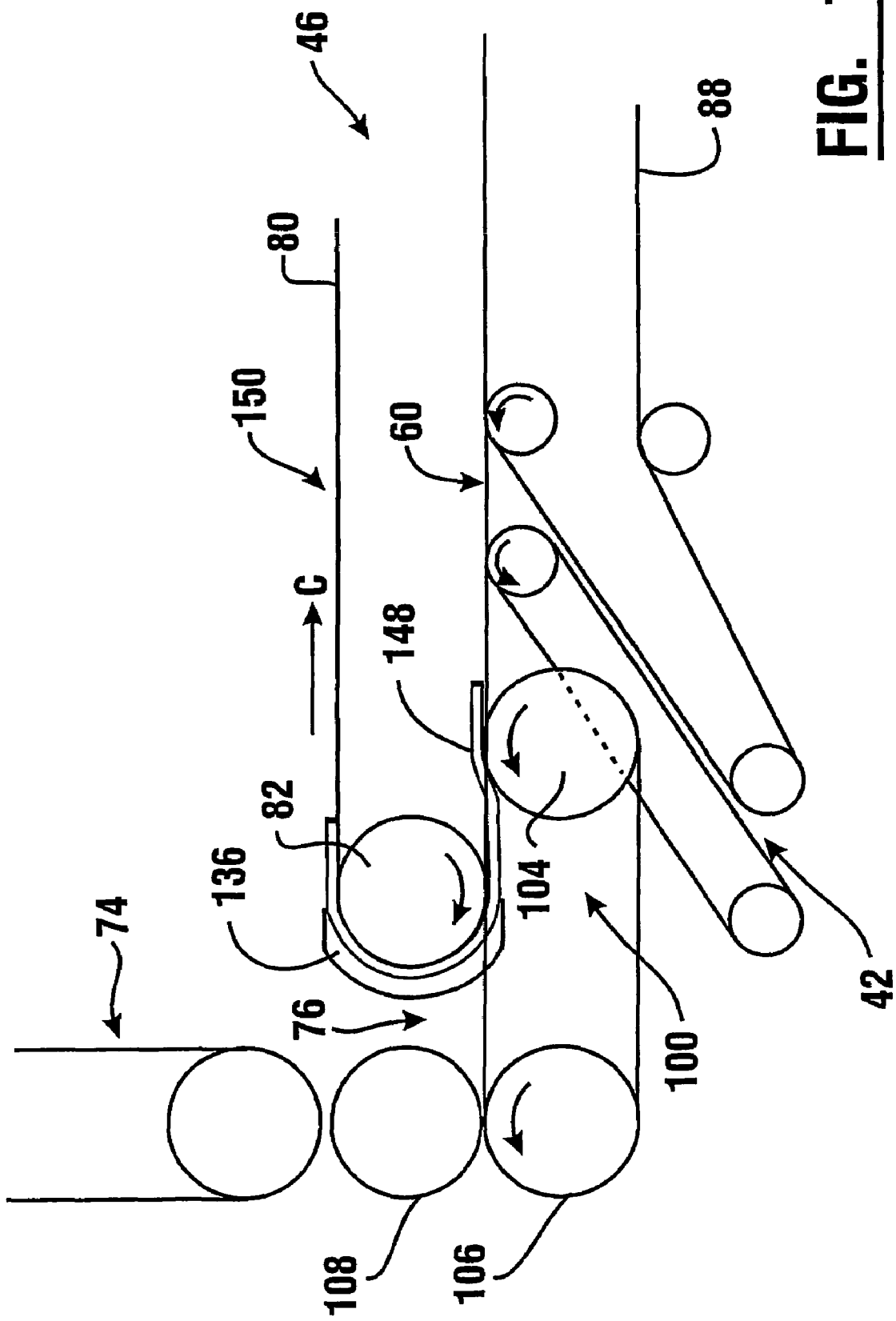
FIG. 15 is a schematic view of the first and second transport paths showing a sheet being reoriented by a sheet turnover device.

As shown in FIG. 15, exemplary machine 10 further includes the capability of taking sheets in the first sheet path and turning them over using a turnover device. This may be done as shown in FIG. 15, through the use of sheet turnover member 136. Exemplary sheet turnover member 136 comprises a member including arcuate guides or tines conforming to the contour of rolls 82. When the turnover member is positioned adjacent to rolls 82, such as in FIG. 15, a moving sheet 148 is caused to be turned over from the position of the sheet in the first sheet path 46. This is accomplished by moving sheet 148 in the direction of Arrow C in FIG. 15. In the exemplary embodiment the upper belt flights of belt 80 are part of a sheet path generally indicated 150. Sheet path 150 extends adjacent to printing device 70 and imaging device 72 shown in FIG. 3. As a result, the sheet may be selectively moved into sheet path 150 for purposes of conducting printing or marking thereon, such as by a cancellation device, for producing an electronic image of the sheet by an imaging device, or both. Of course other or different functions may be performed.

Once the printing or imaging activity has been conducted on the sheet in sheet path 150, the sheet may be returned to the first sheet path 46. Once the sheet 148 is returned to the first sheet path it may be selectively moved to one of the other sheet paths 42 or 74. From these sheet paths it may be directed into and stored in an appropriate sheet storage device or location in the machine. Alternatively, sheet 148 may be selectively moved to be combined in a stack with other sheets at intersections 60 or 76. This may in some embodiments provide for the delivery of cancelled checks to a user. Such cancelled checks may be delivered in a stack with other checks, receipts, notes or other documents.

In some embodiments the sheet turnover members 136 may be configured so that sheets in transport path 150 may be directly added to a stack of sheets at the intersection of sheet path 46 and the turnover device. This is accomplished by configuring or moving the turnover member so that the tines in the lower position do not interfere with the passage of a stack of sheets in the first direction past the turnover member. This feature provides yet another stack assembly mechanism and may be particularly advantageous when a customer receipt is printed on a sheet by the printer in sheet path 150, and it is desired to have the receipt at the top of the stack. This may be achieved by positioning the stack in the holding device formed by holding rolls 108 and transport section 100, and moving the stack in the first direction to the right in FIG. 15 as the printed receipt sheet is engaged in aligned relation with the top of the stack as the stack moves toward opening 20.

It should be understood that in other embodiments, sheets from paths 74 and 42, as well as from path 150, may all be added to a stack as the stack moves from the holding device provided by transport section 100 and holding rolls 108, in the first direction toward the customer. This can be readily envisioned from the schematic view shown in FIG. 16 with the stack 144 moving to the right as shown, and sheets being added to the stack as the stack passes roll 82 and again as the stack moves through intersection 60. As will be appreciated by those skilled in the art, numerous configurations and operations of the system may be provided depending on the functions carried out by the machine as well as the programming and configuration of the control circuitry.

Figure 18:
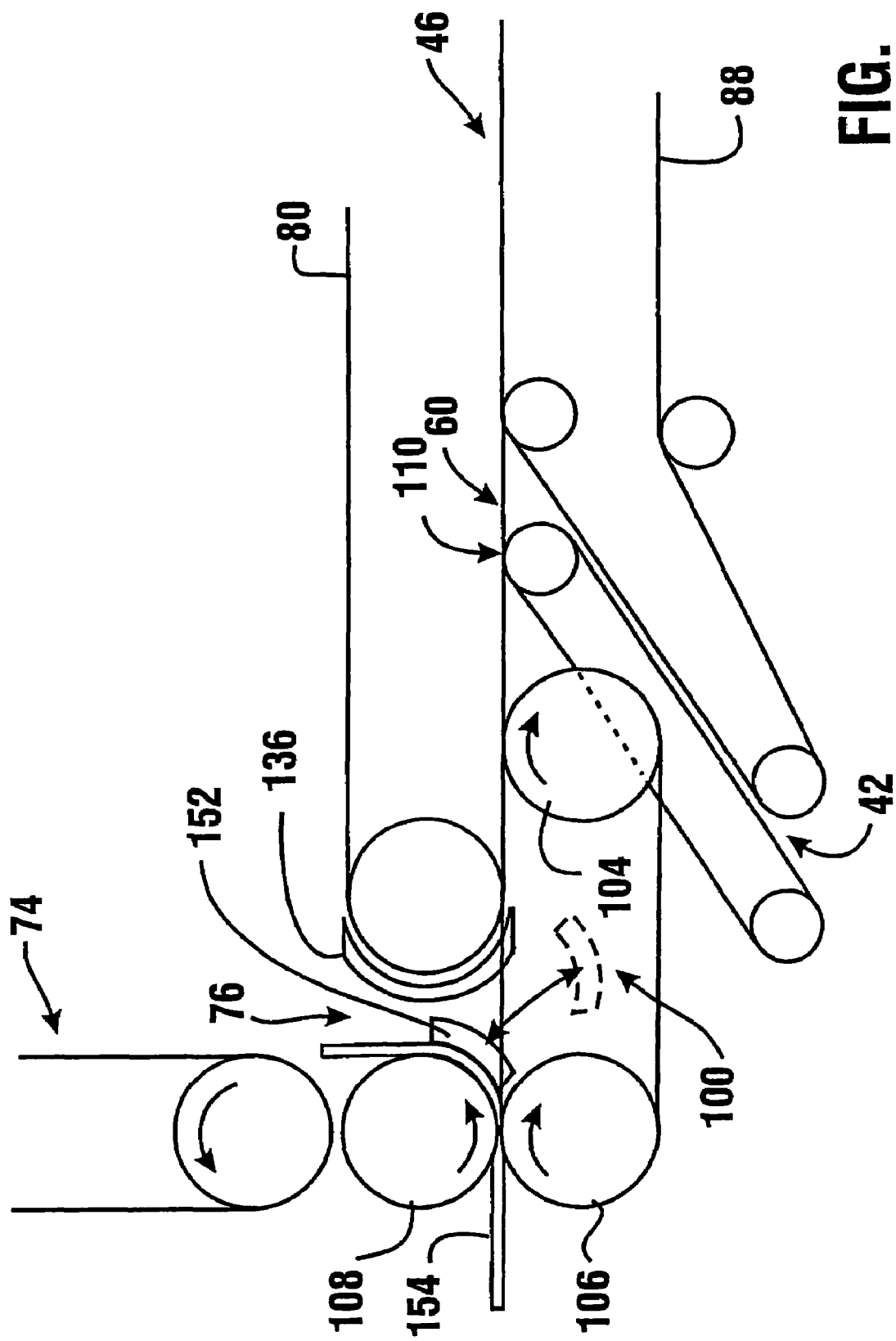
FIG. 18 is a schematic view showing the first, second and third transport paths, with a sheet moving from the holding device to the third transport path.

It should be understood that other sheet turnover devices, other than, or in addition to turnover member 136, may be provided in other embodiments. For example, in FIG. 18 a directing member 152 is shown in cooperating relation with roll 108. Directing member 152 is selectively movable between the position shown, wherein it is adjacent to roll 108 and the position shown in phantom. As represented in FIG. 18, when the directing member 152 is in the position shown it is operative to direct a sheet 154 that is held in the holding device formed by transport section 110 and holding rolls 108 into transport path 74. Sheet 154 may be moved in transport path 74 to a sheet handling device for storage therein in the manner previously discussed.

Alternatively, turnover of the sheet 154 may be accomplished by moving it into transport path 174 and thereafter disposing directing member 152 away from roll 108. Once this is done, sheet 154 may again be directed into path 146 and moved to the right as shown in FIG. 18 so that sheet 154 will move in a manner comparable to that of sheet 146 shown in FIG. 16. This will result in the orientation of sheet 154 being reversed in sheet path 46 from its original orientation.

The components adjacent to intersection 60 may also be operated as a sheet turnover device. This is represented schematically in FIG. 20. This is accomplished by having a sheet 156 initially positioned in the first sheet path similar to sheet 132 in FIG. 7. The sheet is then moved into the second sheet path at intersection 60 by operating the sheet directing apparatus 110 in a manner that is later discussed in detail. Once sheet 156 is in the second sheet path, the direction of belts 88 and 116 is reversed while the lower flights of belt 80 are moved to move the sheet in the second direction indicated by Arrow B. This results in the sheet being turned over from its original orientation in the transport.

Figure 20:
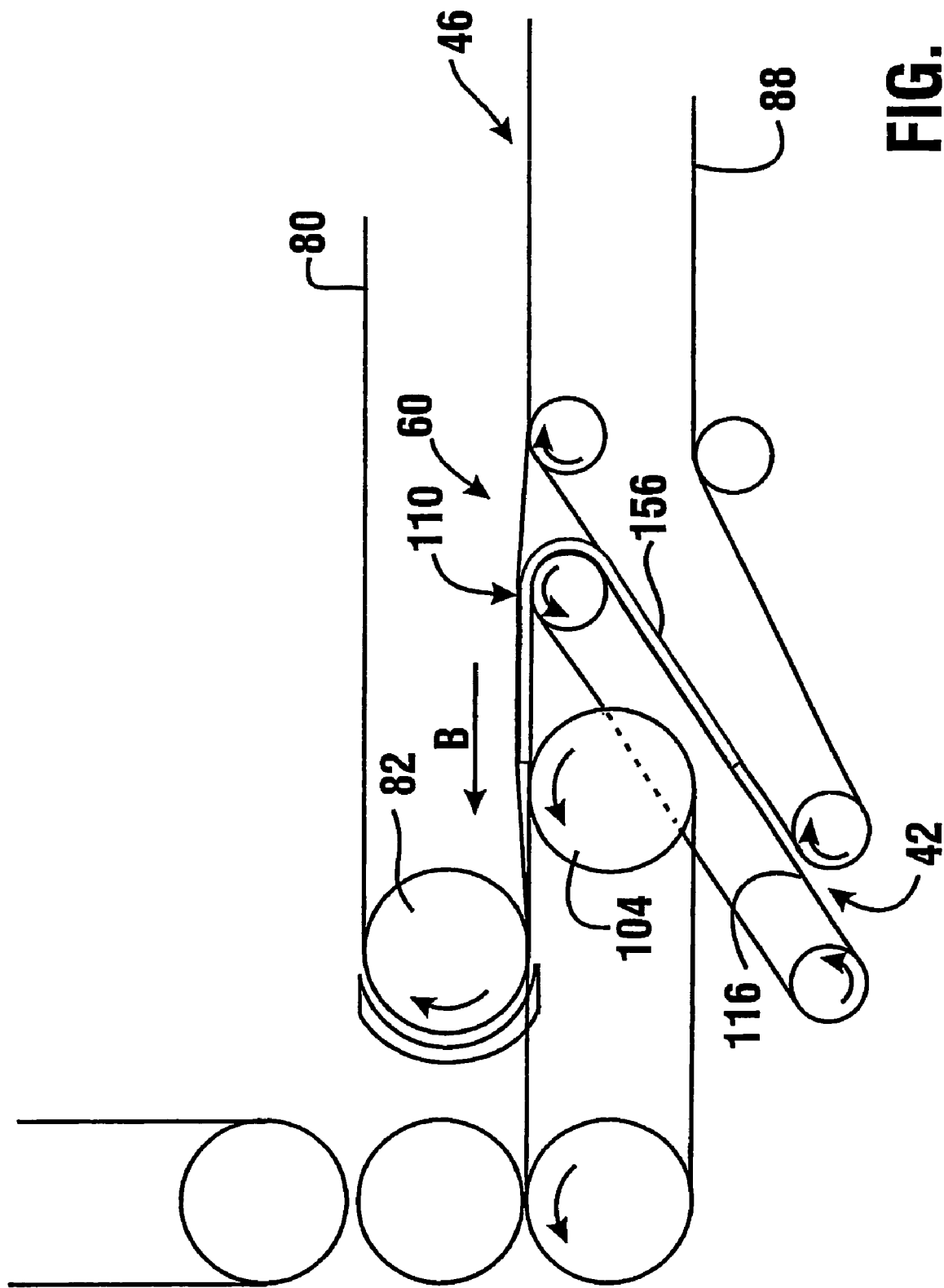
FIG. 20 is a schematic view showing the first and second transport paths with a sheet moving from the second transport path to the first transport path, and schematically demonstrating how the sheet directing apparatus is used as part of a sheet turnover device.

It should be further understood that sheets which originate in transport path 42 may also be directed in the manner shown in FIG. 20. This feature enables selectively positioning sheets and turning them over through a number of different mechanisms this enhances the capabilities of the exemplary automated banking machine.

Figure 13:
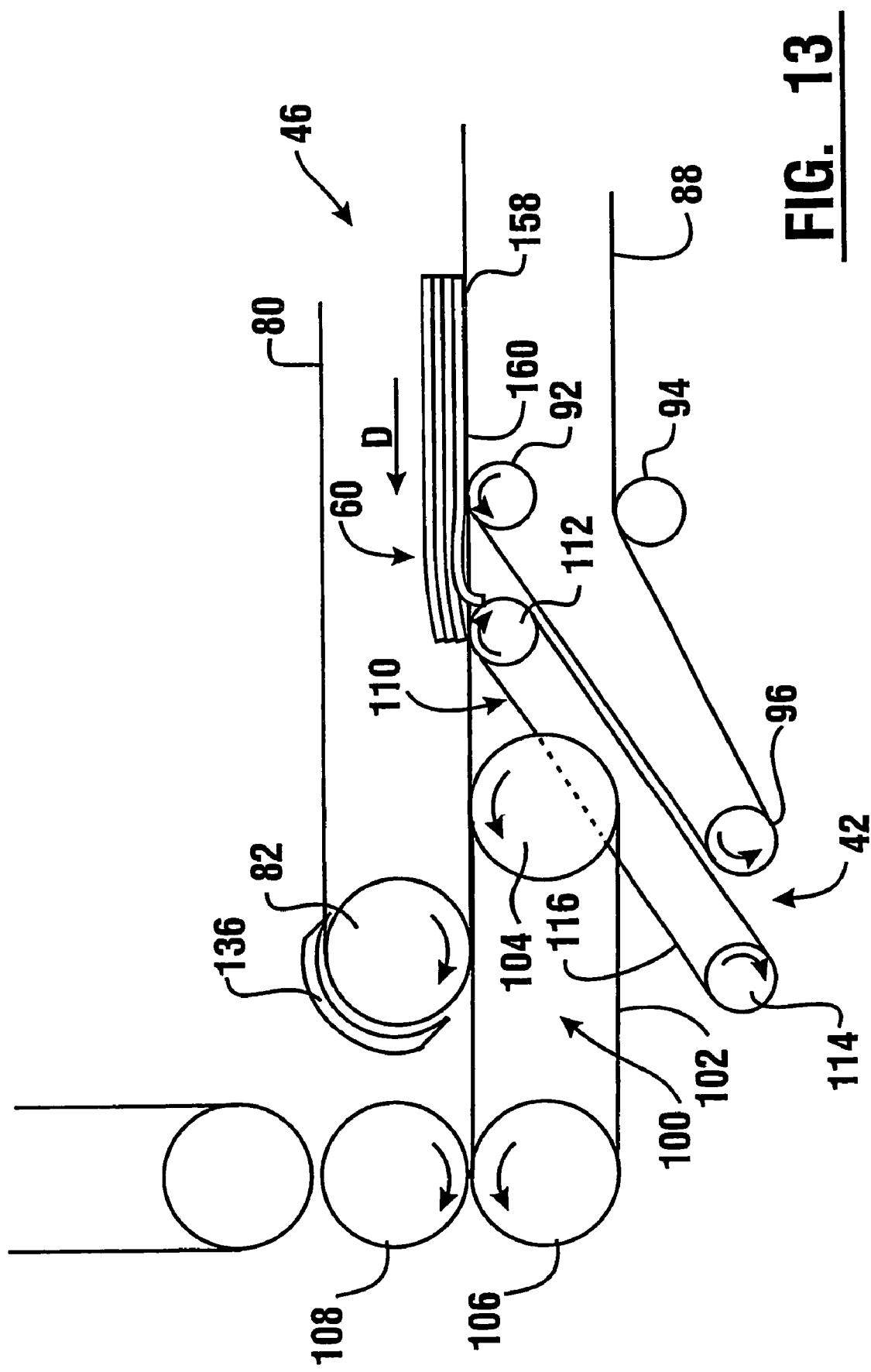
FIG. 13 is a schematic view of the first and second transport paths with the sheet directing apparatus operating to separate a first sheet from a stack as the stack passes through the intersection.
Figure 14:
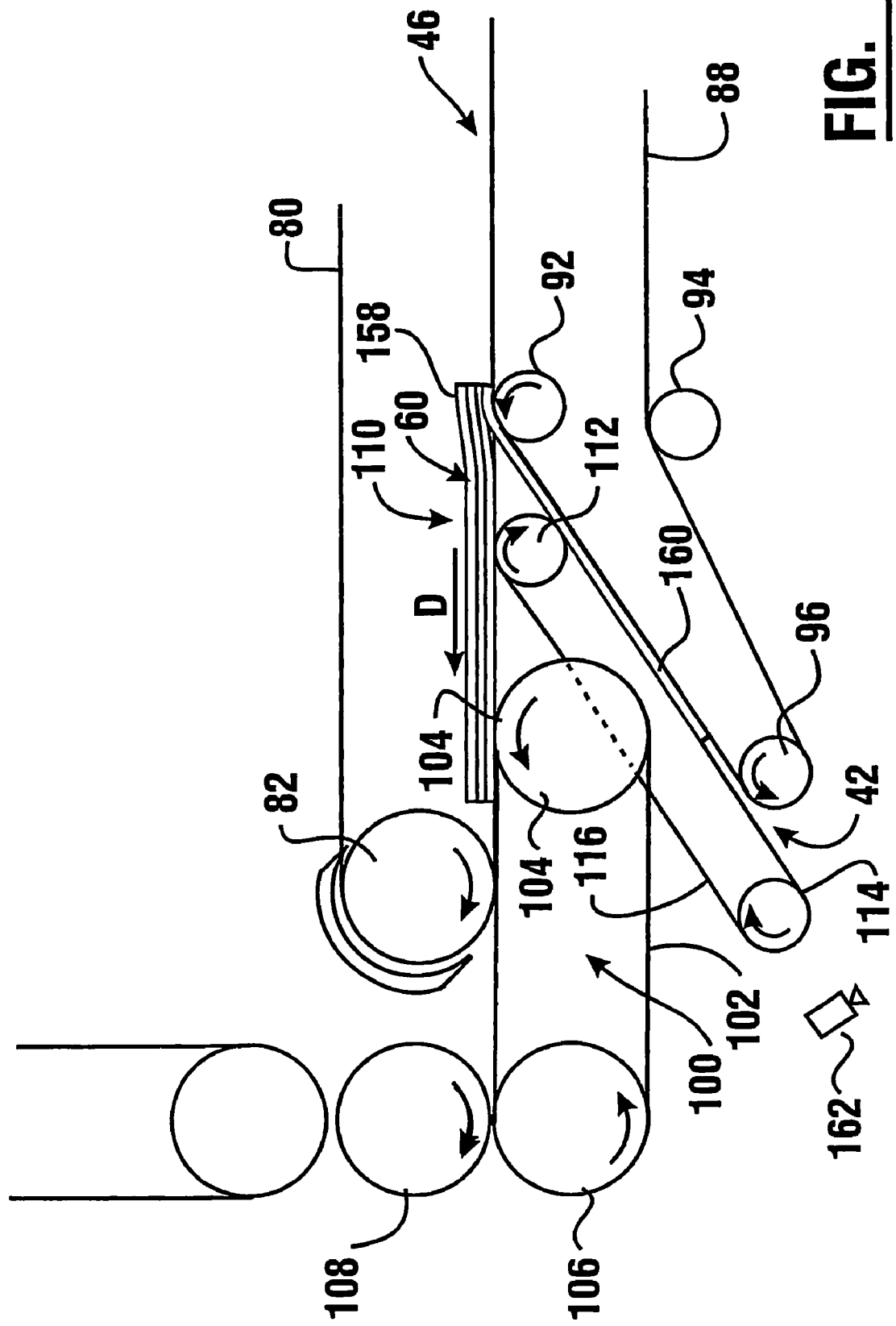
FIG. 14 is a schematic view similar to FIG. 13 showing the sheet separating from the stack as the stack passes through the intersection.

A further useful aspect of the exemplary embodiment is that it includes a separating mechanism for separating sheets from a stack as represented schematically in FIGS. 13 and 14. The exemplary embodiment shown includes the capability of selectively separating a sheet from a stack of sheets as the stack passes through the intersection 60 of transport path 46 and transport path 42. As schematically represented in FIG. 13, a stack of sheets 158 moves in the direction indicated by Arrow B in transport path 46. Although stack 158 is shown as a stack of four sheets, it should be understood that the stack may comprise a greater or lesser number of sheets. Stack 158 may be a stack of sheets received from a user of the machine through opening 20 and may consist of different sheet types. For example in some embodiments stacks accepted in the machine may include stacks of mixed notes, checks and/or other types of sheets As stack 158 moves toward intersection 60 the control circuitry of the machine operates sheet directing apparatus 110 so that rolls 112 and 114, and belts 116 journaled thereon, move relative to the stack in a direction opposed to the direction of stack movement. As a result of this movement by the sheet directing apparatus, a first sheet 160 which bounds a first side of the stack, is frictionally engaged by belts 116 and is stripped and separated from the stack. The first sheet 160 is directed into the sheet path 42 as the stack which comprises the remaining sheets continues on path 46. This enables sheet 160 to be handled separately by the devices adjacent to path 42, or to be later brought individually back to path 46 for individual transport to devices adjacent to other paths.

It should be noted that in the exemplary embodiment a sensor 162 is positioned adjacent to path 42. Sensor 162 may be a photo electric sensor connected to the control circuitry for sensing the position of the sheet. Alternatively, sensor 162 may comprise a plurality of similar or different sensors adapted for sensing features of a sheet. Sensor 162 may be part of a validation device such as that previously discussed that is suitable for determining note type and denomination. This enables the control circuitry to properly identify a currency sheet and place it in a designated note handling mechanism, storage position or other the sheet receiving device. Sensors 162 may alternatively operate in connection with the control circuitry to provide a validation mechanism to determine or assess the genuineness of a sheet. In other embodiments other features such as magnetic ink indicia, bar coding and other features may be detected for purposes of identifying the type of sheet as it moves past the sensors.

As previously mentioned, in some embodiments the validation device may be operative to identify particular sheets, such as by serial number or other characteristics. In some embodiments such information may be stored for suspect notes, and in others for all or certain selected categories of notes. Such data concerning individual notes may be stored in a data store in correlated relation with information usable to determine the identity of the user who provided the note to the machine. Other data may be stored as well, such as for example, the storage location or position where the note is stored in the machine or other information that can be used to recover the particular note and/or to document the transaction.

In some embodiments the machine may hold in a data store, identifying information related to notes for purposes of comparison to notes provided to the machine. This may include in some embodiments information corresponding to properties, characteristics or numbers associated with known counterfeit or invalid notes. Such information used for comparison may also include identifying data for individual notes already deposited in the machine. Thus for example, if a note provided to the machine is individually identified by determining the serial number, the serial number may be compared through operation of the control circuitry to stored data for serial numbers of known counterfeits. Alternatively or in addition, the serial number of the note provided to the ATM may be compared to serial numbers for notes previously deposited or input in the machine. In the event of a match in either example the control circuitry would act in response to the apparent suspect note in accordance with its programming. This may include capturing and storing the suspect note, capturing additional data about the user presenting the suspect note, notifying authorities or taking other action.

In embodiments where identifying data on all notes is captured and used for comparison, the control circuitry may operate to indicate when the note has been dispensed out of the machine. This may include for example deleting the information about the note such as its serial number from the data store upon dispense. Alternatively such indication may include storing the information indicative that the particular note has been dispensed. The information about the note dispensed may in some embodiments be stored in correlated relation with information unable to identify the user who received the note from the machine. Of course other approaches may be used in other embodiments and the approaches discussed with regard to notes may also be applied to other types of documents.

Returning to the discussion of the operation of the separating mechanism, after sheet 160 is separated from the stack 158 as shown in FIG. 14, the control circuitry may operate the transports in the first path 46 to move the remaining stack to a position to the right of the intersection 60. If it is desired to separate an additional sheet from the stack, the remaining sheets may be moved through the intersection again in the direction of Arrow D to accomplish separation of the sheet that is newly bounding the side of the stack. Alternatively, if the control circuitry determines that it is not necessary to separate a further sheet from the stack, the sheet directing apparatus may be operated so that belts 116 and rollers 112 and 114, move in the same direction as rollers 92 and at a similar speed. This will result in the stack passing through the intersection without a sheet being separated from the stack.

It should be understood that while in the exemplary embodiment shown the sheet directing apparatus comprises a plurality of rolls having resilient surfaces thereon that move at a relative speed that is less than the speed of the moving stack, in other embodiments other types of stripping and separating devices may be used. These may include for example, resilient pads or rolls. Such devices may also include resilient suction cup type mechanisms or vacuum generating devices. Further alternative forms of sheet directing devices may include other physical members that engage selectively one or more sheets so as to direct them from path 46 into another path 42.

Figure 23:
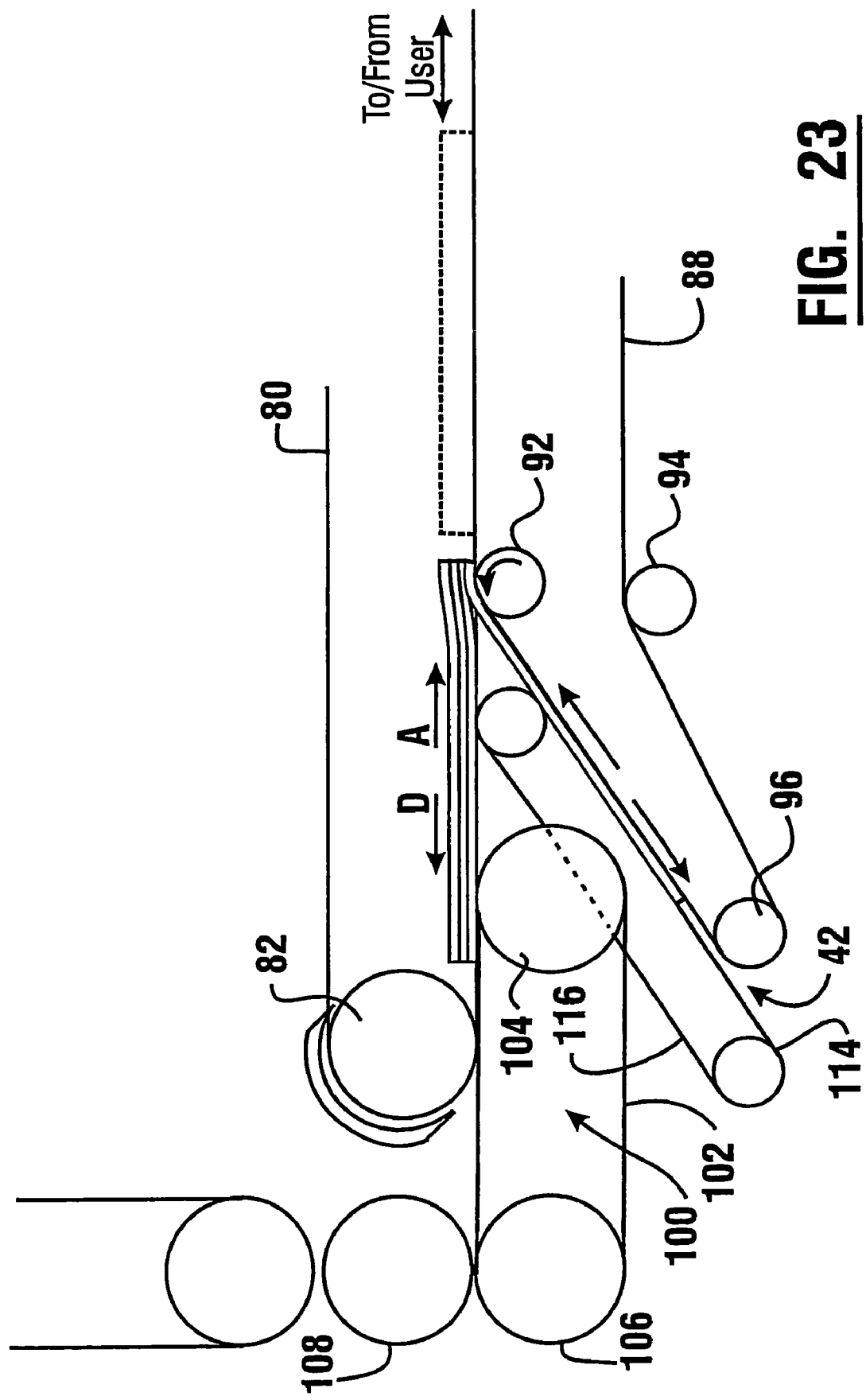
FIG. 23 is a schematic view showing a sheet separating from or adding to a stack as the stack passes through an intersection.

It should also be noted that in the exemplary embodiment shown in FIGS. 13, 14 and 23, sheets may be separated from a stack as the stack moves from right to left. However, in other embodiments it may be desirable to arrange the sheet directing apparatus so that sheets may be separated from a stack when the stack moves in either direction. This may be readily accomplished through arrangements of resilient rollers or other stripping devices or members which may be selectively actuated to engage and separate a sheet upon passage of a stack through an intersection. This configuration may have advantages in other embodiments where greater speed in sheet separation is desired.

As will be appreciated from the foregoing discussion, in some banking machines it may be desirable to process certain sheets individually. For example, if it is determined that a sheet separated from a stack is a check or other negotiable instrument that must be transferred to the imaging device, it may be desirable to clear a path which enables the sheet requiring such handling to be transported individually. This can be accomplished by disposing the stack of sheets that are not currently being processed individually away from the single sheet in first path 46. In this manner the sheet requiring individual handling can be transferred to path 150 or such other location as may be necessary without causing the remaining stack to undergo transport to an undesirable location.

Figure 19:
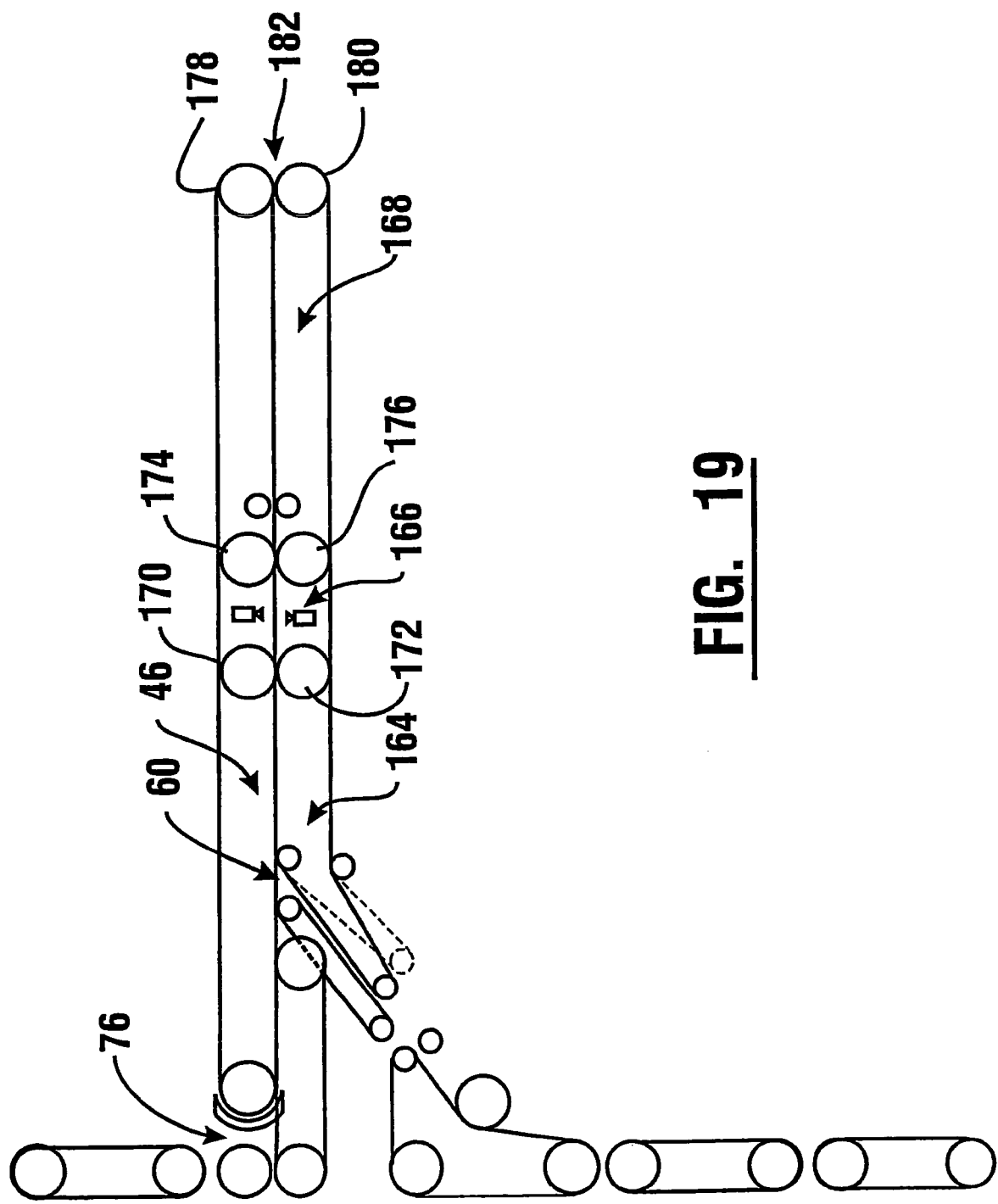
FIG. 19 is a schematic view of an alternative embodiment of the first, second and third transport paths with additional holding devices in the first transport path.

A further alternative to facilitate individual handling of particular sheets is represented by the alternative embodiment shown in FIG. 19. In this embodiment path 46 includes three separately controlled transport sections 164, 166 and 168. Transport section 164 is similar to the transport previously discussed, except that its belts terminate at rolls 170 and 172. Transport section 166 may include an interwoven belt transport similar to that shown in FIG. 5 with the exception that its belts are offset from those in transport section 164. Transport section 166 may be driven by one or more independent reversible drives from transport section 164. The drive for transport section 166 is in operative connection with and operates under the control of the control circuitry.

Transport section 166 terminates in rolls 174 and 176. Rolls 174 and 176 are coaxial with other rolls that are spaced intermediate thereto that are part of transport section 168. Transport section 168 terminates at rolls 178 and 180 which are adjacent to a customer accessible opening indicated 182. Transport section 168 is operated by at least one independent reversible drive in response to the control circuitry.

Transport sections 166 and 168 along path 46 provide locations in which documents or stacks of documents may be temporarily stored as other documents are routed through intersections 60 and 76. After the necessary processing is done on the individual documents, the documents that are temporarily stored in the transport sections 166 and 168 may be moved to other transport sections for further processing. It should be understood that transport sections 166 and 168 include appropriate sensors for sensing the positions of the documents being temporarily stored therein which enables the control circuitry to coordinate movement thereof.

Figure 17:
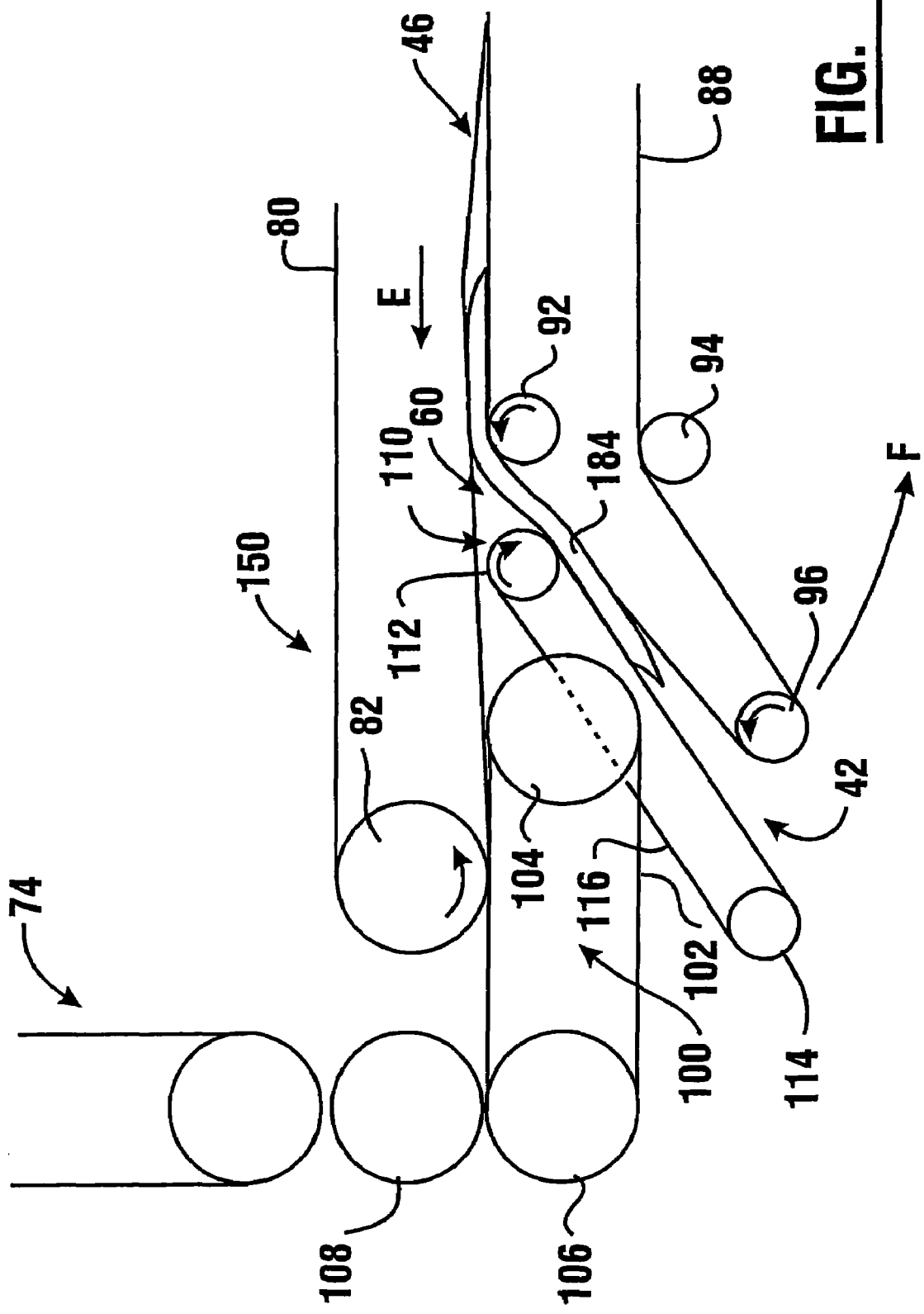
FIG. 17 is a schematic view of the first and second transport paths with a deposit envelope passing therethrough.

A further advantage of the exemplary embodiment described herein is that not only may the automated banking machine 10 accept individual documents and stacks of documents from a customer, but it may also accept conventional deposit envelopes. As shown in FIG. 17 a thick sheet like deposit envelope 184 may be moved along path 46 from a customer. The identification of the deposited item as a deposit envelope may be made based on readings from sensors 126, 128 or 130 as shown in FIG. 4, or alternatively or in addition based on customer inputs through one or more input devices at the customer interface 12 of the machine.

Deposit envelope 184 moves in transport path 46 in the direction of Arrow E as shown in FIG. 17. Upon determining that the item moving in the transport path is a deposit envelope, the control circuitry operates the sheet directing apparatus 110 to direct the envelope into transport path 42. The control circuitry also enables roll 96 and belts 88 to move in the direction indicated by Arrow F. This causes the flight of belt 88 to move to the position shown in phantom in FIG. 4. This enables the envelope to move into the depository device 40 (see FIG. 3) in which it may be stacked in aligned relation with other envelopes. Further the control circuitry may also operate transport 118 and rolls 124 shown in FIG. 4 to assure that envelope 184 does not pass further along sheet transport path 42 than the depository 40.

The ability of the exemplary embodiment of the automated banking machine to handle depository envelopes, stacks of sheets and individual sheets, provides enhanced functionality for the machine. The ability of the exemplary embodiment to accept thick items in the area of path 42 adjacent to the intersection, also enables the control circuitry to use the area adjacent to the intersection as a temporary storage location for stacks of sheets. This may be desirable in some embodiments where a receipt form is delivered on transport path 74 and must be directed to transport path 150 for printing thereon before being combined with a stack to be delivered to a customer.

The exemplary embodiment of the ATM has the capability of storing the assembled stack of sheets adjacent to intersection 60 in transport path 42 until such time as the printed receipt is moved into the intersection along first path 46. As the receipt form is produced by a document producing device and moved into the intersection 60 by transport section 100, the stack is moved into the intersection in coordinated relation therewith so that the printed receipt is assembled into the stack and positioned at the top side of the stack. The assembled stack may be moved along transport path 46 to the opening where it may be taken by the customer.

In some embodiments the ATM may also operate to provide certain types of documents in exchange for other documents. As previously discussed, some embodiments may receive checks or other instruments, validate the check, and provide the user with currency notes. In some embodiments, a user may provide notes to the ATM and receive other types of documents such as money orders, scrip, vouchers, gift certificates or bank checks. In some embodiments the control circuitry may operate in the manner previously discussed to store information concerning individual notes in a data store in correlated relation with information usable to identify the user who deposited the notes in the machine. Some embodiments may store in correlated relation with all or a portion of such data, information which identifies the check, money order or other document provided by the machine to the user.

In some embodiments the ability of a single user to provide cash to the ATM may be controlled or limited to avoid money laundering or other suspect activities. For example, a user placing notes in the ATM to purchase money orders or other documents, may be required to provide at least one identifying input. This may include a biometric input such as a thumbprint for example. Such at least one identifying input may include data on a card or other device a user provides to operate the machine, or may be in lieu thereof or in addition thereto. Alternatively, some embodiments may enable use of the ATM to buy documents such as money orders, gift certificates or other documents without using a card or similar device to access the machine. In some cases a user may exchange notes of certain denominations for notes of other denominations. In such cases the control circuitry may require at least one identifying input from the user requesting to exchange cash for other documents.

The control circuitry may operate in accordance with programmed instructions and parameters to limit the number or value of documents a user may purchase or otherwise receive. This may include comparing user identifying data with data input in connection with prior transactions. This may be done by comparing user input data stored in a data store at the particular ATM, and/or data stored in computers connected to the ATM. By limiting the number or value of documents a user can purchase with cash, either overall, for a particular document or within a given time period, the risk of illegal activities such as money laundering can be minimized. Further such systems may more readily enable funds to be tracked.

Figure 22:
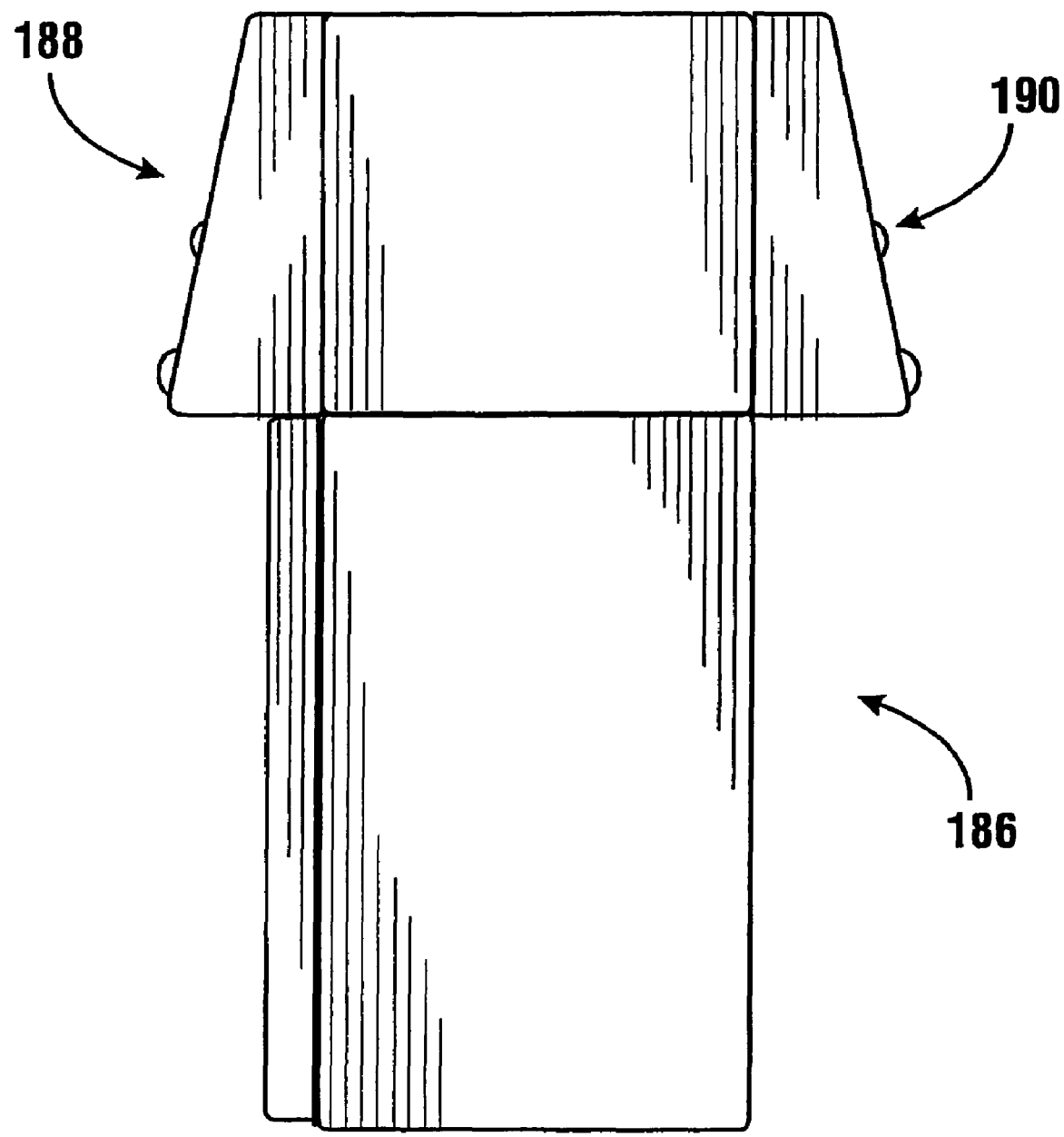
FIG. 22 is a side view of an automated banking machine housing the transport apparatus schematically shown in FIG. 21.

An alternative embodiment of an automated banking machine is indicated 186 in FIG. 22. Machine 186 is similar to machine 10 except that it includes two fascias and customer interfaces designated 188 and 190. Machine 186 is capable of operation by two users generally simultaneously.

Figure 21:
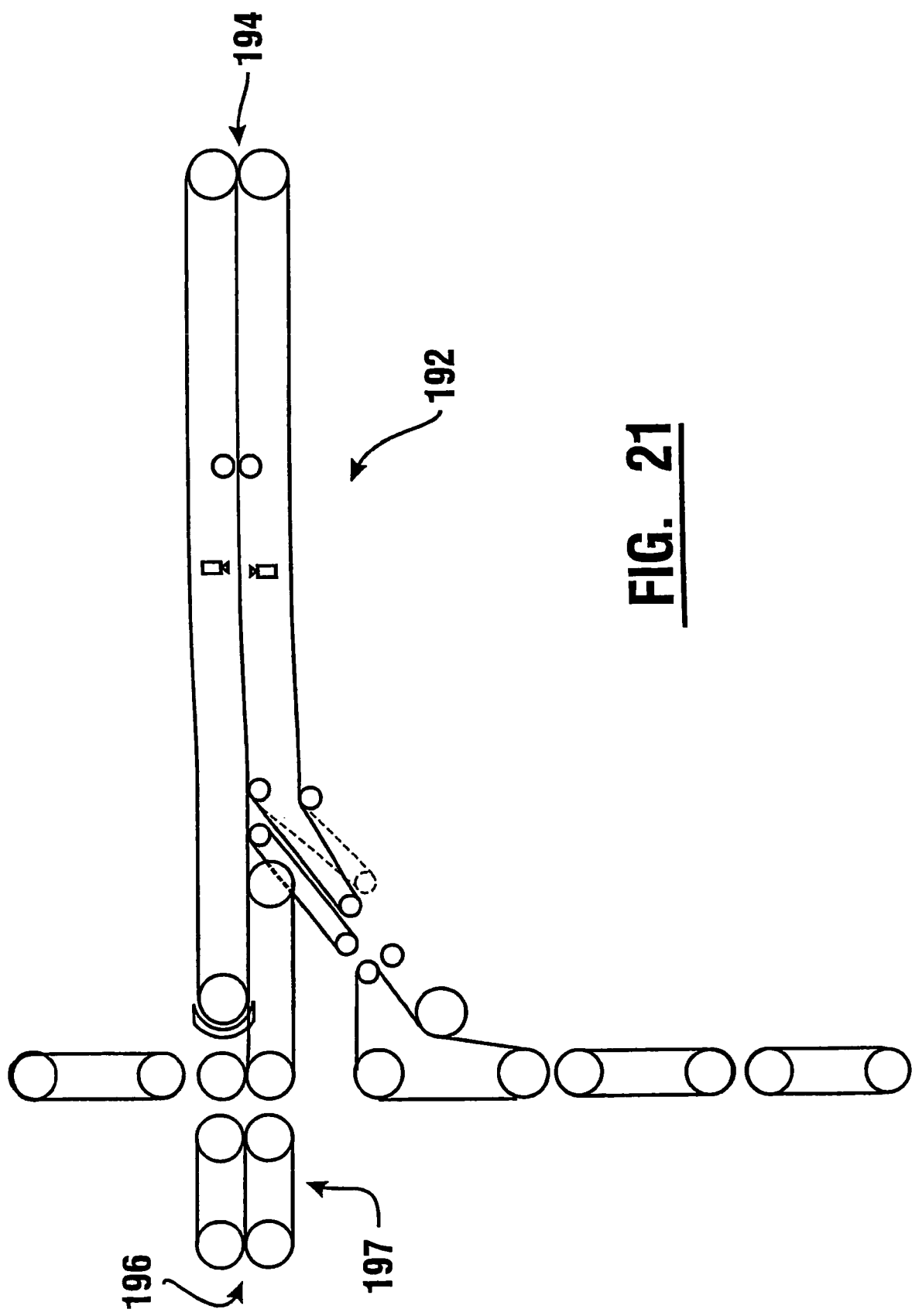
FIG. 21 is a schematic view of an alternative embodiment of the first, second and third transport paths used in an alternative automated banking machine in which two user interfaces and user accessible openings are provided.

The sheet handling mechanism for machine 186 is indicated 192 in FIG. 21. The sheet handling mechanism 192 is similar to that described in the first embodiment, except as otherwise noted. Mechanism 192 includes a first customer accessible opening 194 in customer interface 190, and a second customer accessible opening 196 in customer interface 188. Customer opening 196 receives and delivers sheets through a transport section 197. Transport section 197 is preferably an interwoven belt type transport of the type shown in FIG. 5 and is capable of moving sheets, envelopes and stacks of sheets in engagement therewith. Transport section 197 is operated by a reversible drive similar to the reversible drives used for the other belt transport sections, and is in operative connection with the control circuitry of the machine.

The operation of the alternative sheet handling mechanism 192 is similar to that previously described except that the sheets, envelopes or stacks of sheets that are processed may be received from or delivered to either customer opening 194 or customer opening 196. Because of the high speed capability of the exemplary embodiment, it is possible for the sheet handling mechanism 192 to adequately service two users simultaneously without undue delay.

As will be appreciated from the foregoing description, the modifications necessary for the sheet handling mechanism of the first embodiment to accommodate two simultaneous users is relatively modest. In the exemplary embodiment it is possible to increase the number of customer interfaces on the machine from one to two at a relatively small cost. This is particularly advantageous for an automated teller machine positioned in a high customer traffic area. It is also useful for automated banking machines, such as those used by tellers to count and dispense currency notes. This is because the configuration of the sheet handling mechanism enables two tellers or other personnel to be serviced by a single machine.

Exemplary embodiments may operate to assure operation in accordance with the principles of U.S. Pat. No. 6,315,194, the disclosure of which is incorporated by reference as if fully rewritten herein. Exemplary embodiments may operate using software architectures like that shown in U.S. Pat. Nos. 6,901,382 and/or 6,908,032 the disclosures of each of which are incorporated herein by reference. Further it should be understood that software instructions that cause an automated banking machine to operate may be resident on articles such as a hard disk, CD, DVD, firmware chips, thumb drive or other suitable device.

It should be understood that alternative embodiments may have other or different structures for accepting and dispensing notes or other sheets. These may include for example the sheet dispensing and accepting devices of the incorporated disclosures. Thus for example alternative embodiments may receive notes through one opening in a fascia of the machine and checks through a separate opening. Various mechanisms may be employed to accomplish the note and check accepting functions.

In some exemplary embodiments an automated banking machine may operate through communication with one or more remote computers to enable the carrying out of transactions. This may be done in the manner of certain of the incorporated disclosures. In such embodiments the machine may operate to receive account identifying information from a user through an input device such as a card reader, which reads a card that includes magnetic or other indicia which identifies a user's account. Other identifying inputs may also be received such as a PIN number or biometric input. The automated banking machine operates in accordance with its programming to present outputs that prompt a user to operate the machine and provide the appropriate inputs.

A user may also provide inputs to indicate the type of transaction that they wish to conduct. This may be done through a keypad, touch screen, function keys or other input devices of the machine interface. Generally in an exemplary embodiment, the user can also input at least one value associated with a particular transaction that they wish to conduct. For example a user may wish to withdraw cash from their account. The user provides one or more appropriate inputs to the machine to so indicate. Alternatively the user may wish to make an envelope deposit. The user may give an indication thereof through inputs to one or more input devices. Generally the user will also input an amount associated with the envelope deposit.

Often when the user has input identifying information, the transaction type they wish to conduct, and an amount, the ATM operates responsive to operation of at least one processor in the machine and instructions stored in at least one data store, to communicate with a remote computer. In the exemplary embodiment at least one processor of the automated banking machine may operate to communicate through a network interface card, modem or other suitable communications device with a remote computer operated by a transaction processor, bank or other entity that can determine if the user is authorized to conduct the transaction that has been requested. Generally the remote computer will determine if the account is valid and whether the identifying information that has been input, such as a PIN number, is correct for the particular account. In addition the remote computer will determine if the user is authorized to conduct the transaction, such as by determining the amount of funds that the user has requested to withdraw from the account is available.

If the at least one remote computer determines that the user is authorized to conduct the transaction that has been requested, the at least one computer sends one or more messages back to the banking machine. In response to the messages from the remote computer, the at least one processor in the machine operates in accordance with its programming to cause the transaction function devices in the machine to perform the appropriate functions. For example the at least one processor may operate the currency dispenser to dispense the requested amount of cash to the user. In an exemplary embodiment the at least one processor operates in accordance with its programming to determine if the machine is able to carry out the requested transaction for the user. If the transaction is carried out successfully, the at least one processor operates to cause one or more messages to be sent from the banking machine to the remote computer confirming that the requested transaction was carried out. In response to the receipt of such messages the remote computer is operative to take appropriate action such as to debit the user's account, post a provisional credit for an envelope deposit or take other appropriate action. Of course if the banking machine was not able to carry out the requested transaction the at least one processor is operative to send at least one message to the remote computer indicating this fact. In such circumstances the remote computer may be operative to take action to avoid modifying the user's account if the transaction could not be successfully conducted.

In some embodiments it is possible to generally immediately post a credit to a user's account for items deposited in the banking machine. This may be appropriate in cases where the user has made a deposit of currency notes into a banking machine that can verify the authenticity of such notes. In addition or in the alternative, banking machines that can process and/or image negotiable instruments such as checks may include the capability to accept one or more checks and post the amount thereof to the user's account. In still other embodiments machines of the type described herein may have the capability to accept a deposit consisting of both checks and currency bills from the user and to operate the banking machine so as to promptly cause the amount of the checks and the value of the bills be posted to a user's account.

In an exemplary embodiment the at least one processor operates in accordance with the associated program instructions included in at least one data store, to carry out transactions for users which may include a deposit of checks, currency bills or both. In this exemplary embodiment the at least one processor operates to receive user account identifying information from the user through input devices in a manner like that previously described. The at least one processor then operates in accordance with its programming to provide outputs to the user inquiring as to the type of transaction that they wish to conduct. In an exemplary embodiment the user is enabled to provide inputs to the machine indicating that they are making a deposit including checks, currency bills or both.

In this exemplary embodiment the at least one processor is operative to cause at least one message to be sent from the banking machine to the at least one remote computer. In this exemplary mode of operation, however, the processor in the banking machine does not cause a message requesting a transaction to be sent to the remote computer. Rather in this exemplary embodiment the at least one message is operative to make an inquiry to the remote computer as to whether the particular user's account associated with the account identifying information read by the machine is authorized to have credits posted thereto responsive to one or more messages from the banking machine indicating deposits of currency bills and/or checks into the banking machine, or in some embodiments, deposits of other items that can be made into the machine. The at least one remote computer determines whether the user's account can post such credits directly responsive to messages indicating such banking machine deposits, and provides at least one message providing a positive or negative indication to the banking machine.

In an exemplary embodiment the at least one processor of the banking machine operates responsive to receiving the input(s) from a user indicating that they are going to deposit a check and/or currency bills, to enable the machine to accept one or more of such items. In the exemplary embodiment the machine operates to receive such an item into the machine and to scan or otherwise process the first such item. In the processing of the first such item the at least one processor is operative to generate at least one identifying value which is associated with the user transaction session. In the exemplary embodiment the identifying value or values may take various forms and be based on different parameters. These parameters may include for example, time-based parameters, parameters based on data taken from the item, data stored in memory in the machine, a value generated through operation of a random number generator or other type processor routine, or combinations thereof. The generated at least one identifying value is operative in the exemplary embodiment, to associate all identified items that are deposited by the user in a given transaction session at the ATM. Of course this approach is exemplary and in other embodiments other approaches may be used.

In the exemplary embodiment the at least one processor operates to generate identifying values for each deposit item received by the machine. However, in the exemplary embodiment when more than one deposit item is received from the user in a particular transaction, the identifying values other than the first one are not stored in the data store in associated relation with the items, but rather the first identifying value is associated with each item. Of course this approach is exemplary.

In the exemplary embodiment if the remote computer indicates to the banking machine that the user is authorized to have their account credited for checks and/or currency bills deposited by the user at the ATM, the at least one processor operates in accordance with its programming to accept at least one item into the machine from the user and to analyze the deposited item. This may include for example, allowing the item to enter the machine and determining the amount, micr line data and other data associated with each check that the user places into the machine. This may be done in a manner like that shown in the incorporated disclosures. The at least one processor operates to determine this data and store the data in the at least one data store. In other embodiments the machine may enable the item to be placed within the machine, and accepting the item may include moving the item to another location within the machine, such as a location where the item can be analyzed or stored. Of course various approaches may be used.

Further, in an exemplary embodiment, for each check accepted in the machine the at least one processor is operative to produce image data corresponding to a visual image of one or both sides of the check. This may be suitable for producing a substitute check that may be processed in lieu of a paper check for collection. The image data may be stored in at least one data store through operation of the at least one processor. As previously discussed in the exemplary embodiment data corresponding to the check and/or the image data is stored in associated relation with the identifying value. Such identifying value indicates that the particular item and the corresponding image data and other data is associated with the particular user transaction.

The at least one processor of the exemplary embodiment operates to process each of the checks that has been input by a user. This includes determining the amount of each of the checks as well as the micr line and/or other data associated therewith. In the exemplary embodiment the at least one processor operates to sum all the values associated with each of the plurality of checks that have been placed in the machine. In the exemplary embodiment checks that can be determined as accurately read are accepted into the machine and are held for deposit. Further in the exemplary embodiment sheets that cannot be identified as checks, bills or other items that are acceptable by the banking machine device receiving the particular sheets, are returned to the user. Of course these approaches are exemplary and in other embodiments other approaches may be used.

In the exemplary embodiment if the user has only deposited checks into the machine during the particular transaction session, the at least one processor operates in accordance with its programming to send information corresponding to the total amount of the checks as well as other check data, to the at least one remote computer. In an exemplary embodiment this may be done responsive to at least one user input indicating that the user has no further items to deposit. The at least one remote computer operates in accordance with its programming to receive the data from the banking machine concerning the total amount of the checks deposited. The remote computer then operates in accordance with its programming to credit the user's account for the total amount of the check. Of course this approach is exemplary and in other embodiments other approaches may be used. This may include for example, deferring the crediting of the user's account for a period of time until check image data is received or actual physical checks are recovered from the machine. Of course these approaches are exemplary.

In operation of some exemplary embodiments if the user is also depositing currency bills in the machine, the machine operates in accordance with its programming to validate and identify the denomination of the currency bills. This may include for example, determining characteristics associated with each bill so that each currency bill may be identified. Further in some embodiments the data associated with each currency bill may be stored in at least one data store in association with the at least one identifying value. In the exemplary machine each of the currency bills deposited by a user is validated to determine if it appears genuine as well as to determine the value thereof. In an exemplary embodiment each of the bills is processed through operation of the machine and the at least one processor operates to sum the values of each of the bills to determine the total value of bills deposited by the user in the transaction session. The value data as well as the total value of the currency bills is stored in the at least one data store through operation of the at least one processor. In some embodiments the machine may operate to identify sheets that appear to be counterfeit currency bills and hold them in storage in the machine for removal by proper authorities. In still other embodiments the machine may operate to return sheets that cannot be verified as genuine bills to the user. This may be done for example through processes described in the incorporated disclosures. Of course these approaches are exemplary and in other embodiments other approaches may be used.

If the at least one processor in the machine has determined the total value of all the bills deposited by the user in the transaction, the at least one processor operates to send at least one message to the at least one remote computer. The at least one remote computer operates in accordance with its programming to note the deposit in association with the user's account. This may include in an exemplary embodiment, immediately crediting the user's account for the currency bills received. Alternatively in some embodiments, crediting the user account may be deferred for a period of time or until other functions can be performed. In the exemplary embodiment the identifying values associated with the particular transaction are also transmitted to the at least one remote computer. This enables the computer to associate all of the particular items that have been deposited by the particular user in a given transaction with the other transaction data. Of course these approaches are exemplary and in other embodiments other approaches may be used.

It should be understood that in exemplary embodiments the banking machine may operate in accordance with its programming to receive and process mixed stacks of checks and currency bills. The machine may operate to determine the amount and value of each, and send one or more messages so as to cause a remote computer to credit the user's account. In still other embodiments the machine may operate to receive checks through one mechanism and bills through a separate mechanism. Various approaches to providing inputs and outputs through the user interface may also be provided. These approaches may include for example, the machine instructing a user to input checks separately from bills. Alternatively the machine may request that the user input bills and checks one at a time and/or in a particular order. In some embodiments the user interface may present images of deposited items to a user along with value or amount data, and request that the user provide inputs to verify the amount. In some embodiments the at least one processor may operate to sum the value of bills and checks separately, and then combine them while in other embodiments the values may be summed in mixed fashion.

In the exemplary embodiment data associated with deposit items in a particular transaction by a user are associated with a unique identifying value for that particular transaction. For the next transaction conducted at the machine by another user, the deposit items deposited by that user are associated with a different identifying value, that identifying value being generated in response to the first deposit item deposited by that user. However, in other embodiments other approaches may be used. Of course as can be appreciated, in the exemplary embodiment the use of a particular identifying value for each different user transaction is useful for purposes of correlating items and/or amounts that are deposited during a particular transaction. It should be understood however that these approaches are exemplary and in other embodiments other approaches may be used.

In an exemplary embodiment the automated banking machine is further operative to communicate messages to at least one remote computer, that includes image data for checks that have been deposited in the machine. This image data may be of the type previously discussed which includes data corresponding to the appearance of at least one side of checks that have been deposited in the machine. In the exemplary embodiment the image data is sent with a TIFF, PCX or other suitable image file which can be transferred through operation of the at least one processor, from the automated banking machine to the at least one remote computer. In addition data associated with the checks and/or transaction is also sent as a file from the machine. This may include amount value, account number data, micr line data, time data, machine identifying data or other data that is useful for purposes of documenting and settling the transaction. Of course in an exemplary embodiment the data also includes the at least one identifying value that identifies the checks and/or other items that were deposited in a given transaction. Such image data and transaction data may be sent in various embodiments, in different formats. This may include for example, sending such data in the form of markup language documents or other suitable records. In some embodiments such data and images may be sent to a remote computer after each transaction. In other embodiments such transaction and image data may be accumulated for a plurality of transactions and sent together. Of course various approaches may be used.

In the exemplary embodiment the at least one processor operates in accordance with its programming to include with the transaction data, information related to currency bills that were also deposited during the transaction. This may include in some embodiments a total associated with the plurality of currency items. Alternatively or in addition, the data may include the particular denominations of bills, serial number data, series data or other data associated with identifying the types of bills or the particular bills themselves. Such data may be useful in the manner previously discussed to track the source of particular bills to the particular user who deposited them in the machine. Of course these approaches are exemplary and in other embodiments other approaches may be used.

It should be understood that although in the exemplary embodiment checks and currency bills are accepted in a machine, other embodiments may accept other or additional types of items. These may include items which result in credits to a user's account and/or items which result in debits to the user's account. Such items which result in debits may include for example, charges for bills such as utility bills, phone bills, credit card bills or other documents or items evidencing obligations of a user to pay particular amounts.

It should also be understood that in some embodiments additional data may be generated by the machine and stored in connection with the data corresponding to the particular items. These may include for example, image data corresponding to the user. Such data may also include biometric data, signature data or data from an item carried by the user such as a digital signature associated with a cell phone, RFID tag or other item. Such data may be used to verify the particular source of a given item received in the machine. Of course these approaches are exemplary and in other embodiments other approaches may be used.

Other exemplary embodiments may be used in connection with ATM systems that were developed for use with ATMs that only accept envelope deposits. In such systems ATMs include depositories where users may deposit envelopes into the ATM that contain currency, checks and/or other items. In accepting envelope deposits ATMs generally have no capability to evaluate the deposited items. The user of the ATM in response to outputs generated from the machine, provides one or more inputs that indicate the value of the items included in the deposit envelope. This is done through inputs to an ATM keypad, for example. The ATM communicates with at least one remote host computer, at least one message indicating that the ATM user wishes to make a deposit. The remote computer then determines if the transaction information input by the user such as the account number and PIN number is valid, as well as whether the type of account upon which the user is conducting the transaction is one that can accept deposits. If so the remote computer responds to the ATM with at least one message that causes the ATM to provide access to the entry to an envelope depository so that a deposit envelope from the user may be accepted therein.

If the ATM is able to accept the deposit envelope and provided that the user does not cancel the transaction, the ATM may send one or more messages to the remote computer indicating that it was able to accept the deposit envelope. However, if the user provides an input to the ATM indicating that they want to cancel the deposit transaction before the envelope is accepted, or if for some reason the deposit was not accepted in the machine, such as for example the user did not input a deposit envelope within a specified time period, the machine will indicate through one or messages to the remote host computer that the deposit transaction was cancelled. In response to receipt of a message indicating a cancelled transaction, the at least one remote computer operates so that the attempted deposit transaction has no impact on the ATM user's account.

In such exemplary systems if the deposit envelope is successfully accepted in an ATM, the at least one message from the ATM to the at least one remote computer causes an indication of the deposit in the amount indicated by the user to be associated in at least one data store with the user's account. Generally in these situations the ATM user's institution or other entity responsible for the user's account will post a provisional credit rather than a permanent credit to the user's account. This is because the amount of the deposit and the validity of the deposit items in the envelope cannot be verified at an envelope accepting ATM. Rather the provisional credit will remain until the ATM is serviced and the deposit envelopes therein recovered. The contents of the deposit envelopes are then verified to determine if the total for the contents conforms to the total indicated by the ATM user. In cases where the envelope includes a check, the bank operating the ATM in which the envelope is deposited may wait for the amount of the check to be collected from the bank on which the check is drawn. Once the check is paid the provisional credit associated with the ATM user's account may change to a permanent credit. Of course in situations where a discrepancy is found between the value of the items included in the envelope as indicated to the ATM by the ATM user, and the actual value of the items, the user will be credited only for the actual value. The bank or other institution may also give notice to the user of the discrepancy so that the user is aware that their account will not be credited for the amount they indicated.

It should be understood that what has been described with regard to ATMs which only accept deposits in envelopes and their operation in conjunction with ATM networks is exemplary of approaches that may be used. Some institutions may take somewhat different approaches to accepting and processing transactions involving deposit envelopes. However, many of those different approaches may nonetheless enable integration of the approach of using an ATM which can accept currency bills and/or checks in the manner hereafter described.

In the exemplary embodiment an ATM which includes an imaging device and/or bill validating device can be integrated into an ATM network adapted for use with ATMs that accept deposits in envelopes. This is done by having an ATM that operates in accordance with its programming, to receive information from a user that identifies the user's account such as data read from a card and/or other data such as a PIN. The ATM operates in accordance with its programming to provide outputs which enable the user to select transaction types including transactions which include the deposit of currency bills and/or checks.

In response to the ATM user providing at least one input through an input device which indicates that they wish to make a deposit of currency bills and/or checks to the machine, the ATM operates in accordance with its programming to generate and send at least one message from the ATM to at least one remote computer. This message indicates that the user wishes to make a deposit to their account. This message may include an amount being indicated as the deposit, which amount is generated through the programming of the ATM rather than any amount associated with what the user wishes to deposit. Of course this approach is exemplary.

In response to the at least one message from the ATM, the at least one remote computer responds with the appropriate messages as it would to an ATM that is requesting an envelope deposit transaction. These one or more messages in response would generally indicate that the user's account either can or cannot have a deposit transaction conducted thereon. If the at least one message from the remote computer indicates that the user's account cannot accept the deposit transaction, the at least one ATM will operate in accordance with its programming to provide outputs to the user indicating that the deposit of bills and/or checks that the user wishes to make to the ATM cannot be accepted. The exemplary ATM will then operate in accordance with its programming to either ask the user if they wish to conduct a different type of transaction, and if none is selected to close out the transaction such as by returning the card to the user.

If the at least one message from the remote computer indicates that the user's account can accept the deposit transaction, then the ATM operates in accordance with its programming to accept the deposit of bills and/or checks from the user. In some embodiments the at least one ATM must operate to cancel the effect of the first transaction so as to void the deposit which was not made by the user, being indicated as having been made to the user's account. This is done in the exemplary embodiment by the ATM communicating to the at least one remote computer that the deposit transaction reflected in the messages that test whether the user account can receive deposits, has been cancelled. This can be done by sending a cancellation message from the ATM similar to that which occurs if the user provides a "cancel" input, or a message of the type the ATM sends to indicate to the remote computer it could not complete the deposit transaction, or in another way which has no impact on the user's account balance. In the exemplary embodiment this is done by the ATM through operation of its programming and without the need for the user to provide any inputs cancelling the transaction.

In the exemplary embodiment the ATM operates in accordance with its programming after the test transaction has been cancelled, to receive bills and/or checks from the user into the machine. These items are evaluated as previously discussed, and the amounts thereof determined through the operation of the devices included in the ATM. The exemplary ATM further operates as previously discussed to determine the total value associated with the user's deposit. The ATM may also operate in accordance with its programming to store data which associates each of the deposited items with the user and/or the transaction. Of course in other embodiments, values associated with each of the deposit items may be calculated and sent individually to the remote computer or summed or partially summed. Various approaches may be implemented through the programming of the ATM.

In the exemplary embodiment, after the ATM has determined a total value associated with the checks and/or bills to be deposited by the user, the ATM operates in accordance with its programming to again communicate with the at least one remote computer. The communication with the at least one remote computer includes at least one message requesting a second deposit transaction indicating a deposit to the user's account in the amount of the total value. The at least one remote computer, which in the exemplary embodiment is associated with the bank or other institution which has responsibility for the user's account, operates to record in at least one associated database that a deposit in the amount of the total value has been made to the user's account.

As can be appreciated, in this exemplary embodiment, the deposit transaction may appear identical to the remote computer to a deposit made in an envelope to an automated banking machine. Thus in some embodiments the user's account may not be immediately credited for the total amount of the deposit and only a provisional credit for the amount of the deposit may be granted instead of a forced posting of the credit, as such a provisional credit would be indicated until the content and value of an envelope deposit is confirmed. The provisional credit may become a permanent credit upon collection of the amount of the check by the bank owning the ATM, or other automatic or manual input to cause a permanent credit to the account. Of course this approach is merely exemplary.

In exemplary embodiments where deposits are made to an ATM in the form of checks and/or currency bills, and the ATM is operated in a system that is configured for ATMs to accept envelope deposits, additional processes may be instituted. These processes may identify the ATM deposit as other than an envelope deposit and may cause the at least one remote computer to permanently credit the user's account earlier than would otherwise be done in the case of an envelope deposit. These processes may include for example, the programming of the at least one remote computer to have data stored in association therewith which indicates that the particular ATM originating the transaction has devices which evaluate bills and checks. The at least one remote computer may operate in accordance with its programming, to post credits for such deposits in a permanent fashion earlier based on the identity of the ATM initiating the transaction. In some embodiments the remote computer may credit the user's account for bills received earlier than checks which must be paid on by the institution of the maker of the check. Various approaches may be used in alternative embodiments depending on the programming of the at least one remote computer.

In other embodiments the ATM may be operated to send data corresponding to checks and/or bills included in the deposit transaction to one or more remote computers operated by a bank. Upon receipt of this information including the data which associates the deposit with a particular ATM transaction, the at least one computer operated by the bank may be notified that the values associated with the deposit items have been verified and a permanent credit for the deposit items made to the ATM user's account. This may be done for example in response to review of the check images, bill images or other data as sent from the ATM to the remote computer. This image review may be done visually by an operator viewing an electronic image on a display or through an automated process. However, in response to verification of the items deposited and their values, the at least one computer may operate to cause the appropriate credit to be posted to the user's account. Of course these approaches are exemplary and other approaches may be used.

In some exemplary embodiments the at least one processor in the ATM operates in accordance with its programming to operate in a manner that may help assure that the character recognition software which is operated in the ATM properly determines the value associated with a deposited document such as a check. This may be done for example by providing to the user of the banking machine an output through the display of the machine which shows an image of each check that the machine has received from the user in the particular transaction. In addition, in an exemplary embodiment the machine operates to output through the display, a transaction related statement which may include an amount associated with the check, bill or other document which has been determined through the operation of the at least one processor in the machine. The transaction related statement may ask the user whether the amount or other information in the transaction related statement is correct. The user is then enabled to provide at least one input through an input device on the banking machine to indicate whether the amount determined or other information is correct or incorrect. The machine may then operate in accordance with its programming to proceed with the transaction if the user indicates that the information is correct. Alternatively if the user indicates that the information is not correct, the machine may take other action such as to return the item to the user, attempt further processing of the item to determine appropriate data and/or the machine may prompt to the user to provide an input that corrects the transaction related statement information which the user has indicated is incorrect. Of course these approaches are merely exemplary of many that may be used in different embodiments.

In an exemplary embodiment the automated banking machine operates in accordance with its programming to provide outputs through a display of the machine showing the check or other deposited item to the user. In order to assure that the representation of the deposited item is of a suitable size, an exemplary embodiment operates to produce modified image data which enables the machine to output a representation of the deposited item on the display in a manner which is generally suitable for the user to review the item. This modification of the image data may be operative to assure that the deposited item is shown of sufficient size when displayed to the user, even in cases where the item itself may not be suitable to be shown in its full size and/or normal proportions on the display.

In an exemplary embodiment an automated banking machine includes a display such as a CRT, LCD or other suitable type of visual output device. FIGS. 24 and 25 represent a display 200 of an exemplary machine. The display has a visual output area 202 which generally corresponds to the area of the display that is visible to a user of an automated banking machine during a transaction.

In an exemplary embodiment the programming of the at least one processor in the banking machine is operative to provide a visual representation of a deposited item in a first region 204 of the display. In this exemplary embodiment the first region corresponds to the upper half of the visual output area of the display. In the exemplary embodiment at least one processor of the machine operates in a manner that will be discussed, so that a modified visual representation of generally an entire first side of a deposited document will occupy at least a predetermined portion of at least one of the overall height and overall width of the visual output area of the display. In this way a deposited item is shown in a sufficient size so that characters included thereon can be seen by the user. For example in FIG. 24 the first region of the display 204 includes a visual representation 206 of a check. FIG. 25 includes a visual representation of a utility bill 208. Of course these items are merely representative of items that can be accepted by a banking machine and presented in the manner discussed.

In the exemplary embodiment the at least one processor in the machine operates to cause the output of a transaction related statement in a second region of the display 210. In the exemplary embodiment the second region of the display corresponds to the lower half of the visual output area. Of course this approach is exemplary and in other embodiments other approaches may be used. The exemplary machine is operative to output a transaction related statement during at least a portion of the time that the visual representation of the item accepted in the machine is being displayed. The transaction related statement is output through the display responsive to the programming of the particular banking machine and the type of item that is being input.

In FIG. 24 a transaction related statement 212 asks a user if the amount of the check as determined by the character recognition software operating in the machine is correct. This amount data may be determined in the manner previously described and/or in the manner discussed in the incorporated disclosures. The programming of the machine which outputs this exemplary transaction related statement 212 includes an opportunity for a user to provide an input to indicate whether or not the amount determined by the machine as corresponding to the check is correct. FIG. 25 includes a transaction related statement 214. The transaction related statement 214 asks a user if the amount of the bill 208 that the machine has determined, is correct. Again the transaction related statement 214 provides the user with an instruction to provide an input in response to the statement. It should be understood however that these transaction related statements are exemplary and other approaches may be used. For example in some embodiments transaction related statements may not require the user to provide a responsive input. Alternatively or in addition, other transaction related statements may require different types or multiple inputs such as alphanumeric inputs, biometric inputs or other types of inputs. Of course the particular transaction related statement depends on the particular type of document which is accepted in the machine, the type of transaction involved and the programming associated with the at least one processor in the banking machine.

In an exemplary embodiment visual representations of documents accepted by the machine are output so that generally at least one image of an entire side is output through the first region of the display, so that it occupies at least a predetermined portion of at least one of the overall height and overall width of the visual output area of the display. This is done through operation of the at least one processor in the machine producing image data which corresponds to a visual representation of generally at least one entire side of the documents. Of course in some embodiments the image data may correspond to both sides of the document. It should be understood also that in some embodiments the at least one processor may operate to mask, delete or otherwise modify some of the image data so as to prevent the output of such data from the screen. This may include for example information such as micr data on the check, a user's social security number on a government document or other selected data. However, even in embodiments where such data is masked or otherwise not visible in the output from the display, the exemplary embodiment provides an output which corresponds generally to at least one entire side of the received document.

At least one processor in the exemplary machine then operates to produce modified image data from the original image data produced from the document. The modified image data is adapted to produce in the first region of the display, a modified visual representation of the entire at least one first side of the document. In the exemplary embodiment the image data comprises data corresponding to a plurality of pixels which have varying properties. These properties correspond to visual appearance of the imaged item in a corresponding location of the item. In an exemplary embodiment the imaging device operated in the banking machine in conjunction with at least one processor, is operative to produce a rectangular array of pixel data. This rectangular array of pixel data includes rows and columns of pixels which correspond to the imaged item. Such pixels may be produced and/or processed using approaches such as those discussed in U.S. patent application Ser. No. 09/414,290 filed Oct. 7, 1999, the disclosure of which is incorporated herein by reference. Of course numerous approaches may be used.

The image data generated through operation of the imaging device includes pixel data which corresponds to a predetermined number of columns and rows of pixel data comprised in a rectangular array. The columns correspond generally to a predetermined number of vertically aligned pixels. Likewise the rows correspond to a predetermined number of horizontally aligned pixels. While in the exemplary embodiment a rectangular coordinate system is used for the array, in other embodiments other approaches may be used.

In order to produce modified image data that is suitable for output in the first region of the display, the at least one processor is operative to determine from the image data at least one ratio based on the height and width of the document. For purposes of this discussion it will be presumed that the document comprises a check, but it should be understood that similar processes may be conducted with other types of documents. The at least one processor is operative to determine if the height dimension of the check is less than one half the check width. This is done through operation of the processor comparing the number of pixels in the rows and columns of the image data which correspond to the document that has been imaged. If the height of the document is determined to be less than one half the width, modified image data is produced through operation of the at least one processor so that the modified image data is produced and the output through the display is a modified visual representation of the document which generally fills the first region of the display. In an exemplary embodiment this modified image data corresponds to an array 240 pixels high and 640 pixels wide.

Alternatively if the at least one processor determines that the check or other document height is greater than one half the width, the at least one processor calculates a check height to width ratio. The processor then operates to produce modified image data so that the visual representation output through the first region is a modified visual representation of the document that has a height dimension that generally corresponds to the vertical height of the first region of the display and the length dimension of the document is a function of the vertical height dimension of the modified image data and the check height to check width ratio as calculated by the machine.

An example of the first height to width ratio condition is represented in FIG. 24 by the image data 206. Because of the height to width ratio of the check, the modified image data produced is suitable for filling generally the entire first region of the display with the output visual representation of the check. In contrast the bill represented in FIG. 25 has a height which is greater than one half the width of the document. As a result the height of the modified image data is such that the visual representation being output generally occupies the entire vertical height dimension of the first region. The length of the modified visual representation does not fill the entire horizontal dimension of the first region, but rather has a width that is based on the height to width ratio calculated by the machine. This generally keeps the visual representation of the document in proportion to the original paper document, and helps to assure that it is readily recognizable by the user.

In an exemplary embodiment the modified image data which is used to produce the modified visual image of the document output from the banking machine, is produced through execution of the programming associated with at least one processor in the banking machine. In the exemplary embodiment the at least one processor changes the vertical height of an image by repeating rows of pixel data in the array that make up the image. In an exemplary embodiment the at least one processor operates to select rows of pixel data randomly within the array and then to repeat that row of data by inserting an adjacent row in the array. Each time this is done the height of the image data is increased by the height of one row of pixels. Selecting the rows of pixels to be duplicated randomly generally does not distort the overall appearance of the document to a great extent.

Likewise in producing modified image data the at least one processor may operate to repeat columns of pixels included in the array. Repeating columns of pixels operates to increase the length of the visual representation document. Further in an exemplary embodiment the height or width of the image data may be reduced by eliminating rows or columns of pixel data respectively. As can be appreciated the at least one processor may adjust the image data so that it corresponds to the appearance of the document but is still modified to occupy at least a predetermined portion of an overall height and/or width within the visual output area of the display.

It should be understood that the approach of producing modified image data by repeating and/or deleting rows and columns of pixel data on a randomly selected basis is but one approach that may be used. Other approaches may include for example, analyzing the properties of the pixels included in a particular row or column in deciding whether to delete and/or repeat such a row or column. For example if a column of pixel data is determined to have pixels which are all within a very close range, the computer may operate to favor repeating or deleting this row in adjusting the image data. Such a condition may indicate that the pixels correspond to an area which is all dark, which may correspond to a line such as a border line on a check, or all light which may indicate a blank area on the check or other document. Such areas may be more readily expanded or deleted without impacting adversely the output image of the check. Alternatively or in addition template data may be used in conjunction with analyzing deposited documents as described in incorporated disclosures. Such template data may be indicative of where characters such as amounts, micr line data, account numbers, signatures or other data is located within the image data that corresponds to the deposited document. Template data may be used to enable a processor to determine areas within the image data which is away from the areas that are important for purposes of the transaction related statement. For example in an exemplary embodiment where a user is asked in the transaction related statement to verify the amount of the check as determined by the machine, the processor may operate to avoid modifying image data in the area where the amount is shown. Of course these approaches are exemplary of numerous approaches that may be used.

It should also be understood that the exemplary outputs of FIGS. 24 and 25 are just examples of approaches to presenting modified image data and transaction related statements. Various approaches to providing such outputs either separately or individually may be used depending on the particular type of transaction document and programming of the automated banking machine.

In an exemplary embodiment the automated banking machine facilitates transactions by providing software components that serve to identify character data which is included in image data, such as image data corresponding to checks. The exemplary embodiment further has a separate software component, which operates to receive the character data identified by the first software component and to determine the character values corresponding to the character data. These character values may include for example the numbers, symbols, letters or character types associated with the character data. Such software components may include character recognition software of the types previously discussed. Such character recognition software in the exemplary embodiment determines the character values such as for example, micr line data or the amount of a check which the banking machine operates to includes in messages that are sent to remote computers.

Figure 26:
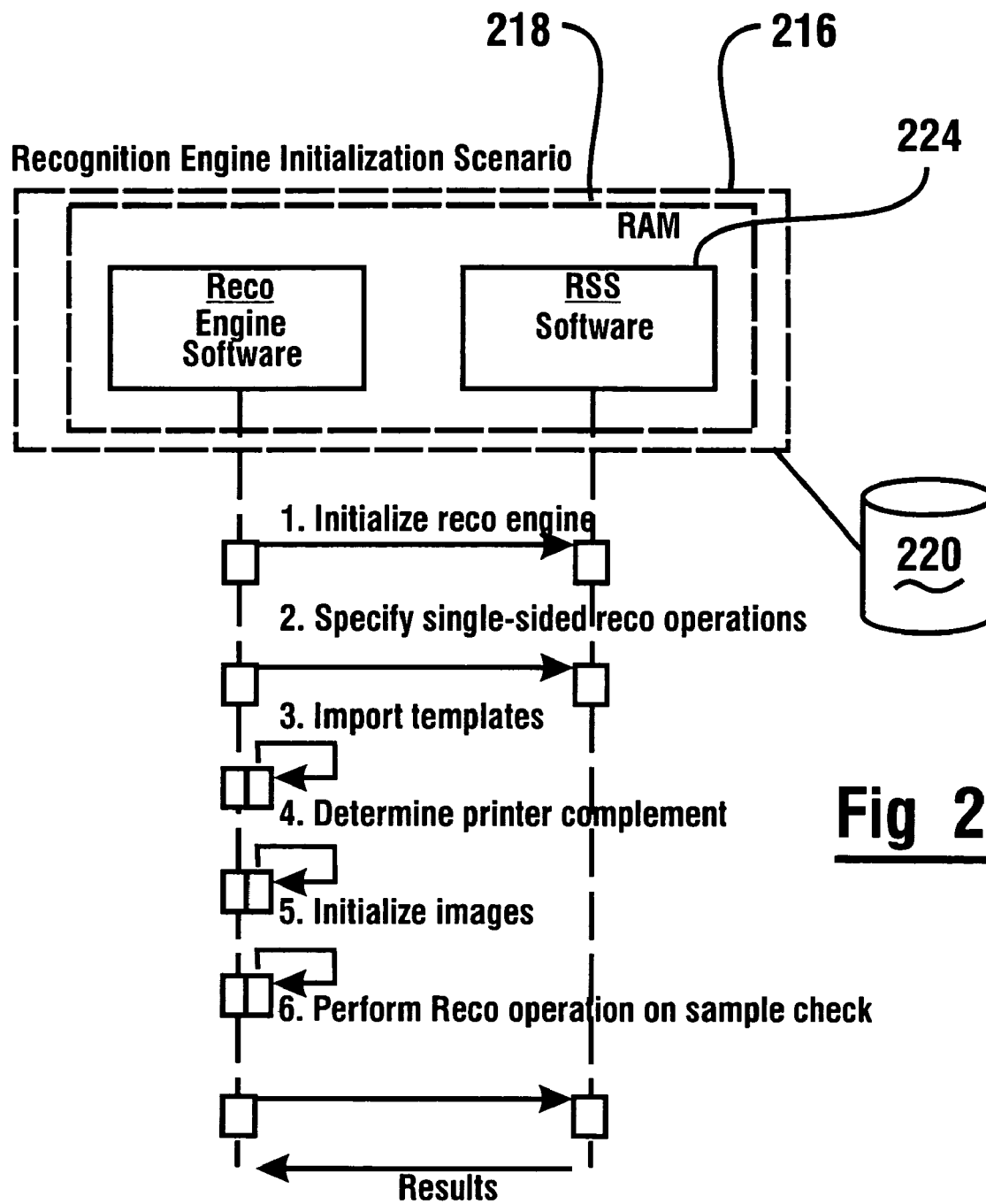
FIG. 26 is a schematic view of steps carried out by software components of an automated banking machine in a starting sequence.

FIG. 26 includes a schematic representation of the software components that operate in one or more processors schematically indicated 216. The one or more processors 216 include random access memory (RAM) 218 in which software instructions are executed. One or more data stores schematically indicated 220 are operative to hold executable software instructions and data. These software instructions are selectively loaded into the random access memory responsive to operation of the processor.

In the exemplary embodiment during operation of the automated banking machine, a first software component 222 is operative. In the exemplary embodiment software component 222 operates to perform the functions of a recognition engine. The recognition engine operates in a manner described in the incorporated disclosures to identify character data that is included in image data that is generated through operation of the imaging device. In an exemplary embodiment, software component 222 uses template data loaded from the data store 220 to identify the character data within the overall image data corresponding to the document. This template data is operative to identify selected areas within the image data which are likely to contain data of interest. This may include for example in the case of a check, an area within the image data which contains the courtesy amount, legal amount and micr line data. The template data may be applied through operation of software component 222, to identify the locations of this character data within the image data which has been generated by the imaging device in response to the document received.

In the exemplary embodiment the second software component 224 operates in random access memory. The second software component 224 includes character recognition software which may be of the types previously discussed. Software component 224 operates responsive to the character data and determines at least one character value that corresponds to the data. The character values in exemplary embodiments may include numbers, letters, symbols or character types which correspond to the character data. In this exemplary embodiment, the recognition software is enabled to take the data which software component 222 has identified as potentially including the amount of the check, for example, and determine what numerical values that character data corresponds to. Also in the exemplary embodiment the recognition software is operative to provide to the recognition engine an indication of a degree of assurance that the data determined by the recognition software is accurate. In this way the software recognition engine is enabled to act in a manner described in the incorporated disclosures to determine which of the applied template data produces data which corresponds to the particular document, and then further determine the character values which correspond to the visual information which is on the check. Of course it should be understood that these approaches are exemplary and in other embodiments other approaches may be used.

In the exemplary embodiment the recognition engine software component 222 also operates to determine properties associated with printing devices in the automated banking machine. The properties associated with the printer as determined by this software component enable the automated banking machine in some embodiments to carry out printing activities as is appropriate in particular transactions. These printing activities may include for example, printing indicia corresponding to checks or a portion thereof on receipts that are produced by the banking machine for customers. Alternatively or in addition the determined properties of printers may be used to enable the machine to print data on a cancelled check through operation of at least one printer operating in the machine. This may operate for example to enable a check that is received in the machine to be marked as cancelled so that it can no longer be negotiated. In addition or in the alternative, in some embodiments the recognition engine software component may determine printer properties so as to enable the printing of additional or substitute routing data on a check document that is received in the machine. Of course these approaches are exemplary of approaches that may be used.

In an exemplary embodiment the software components are operated to reduce delays that might otherwise be incurred when a banking machine user presents a document such as a check that must be analyzed. These delays are minimized by including programmed instructions which cause the banking machine to execute a starting sequence prior to a machine user inputting their card into the machine so as to initiate a transaction. The exemplary starting sequence is operative to cause the instructions of the first and second software components to be loaded from the data store 220 into RAM 218. In addition the exemplary software operates to initialize its instructions by calling to the recognition software component and specifying to the recognition software that the recognition software is to operate in a single side document analysis mode. These two steps are represented schematically in FIG. 26.

In the exemplary embodiment the first software component also operates as part of the starting sequence to load the template data from the at least one data store into random access memory. As previously described, the template data is adapted to enable the first software component to identify character data which corresponds to visual characters within the image data that is produced by scanning of a document. This is represented schematically by the third step in FIG. 26. The software component 222 is also operative through operation of the at least one processor, to determine at least one property of at least one printer in the banking machine which will operate in response to the execution of the first software component. This is represented in the fifth step shown in FIG. 26.

Figure 27:
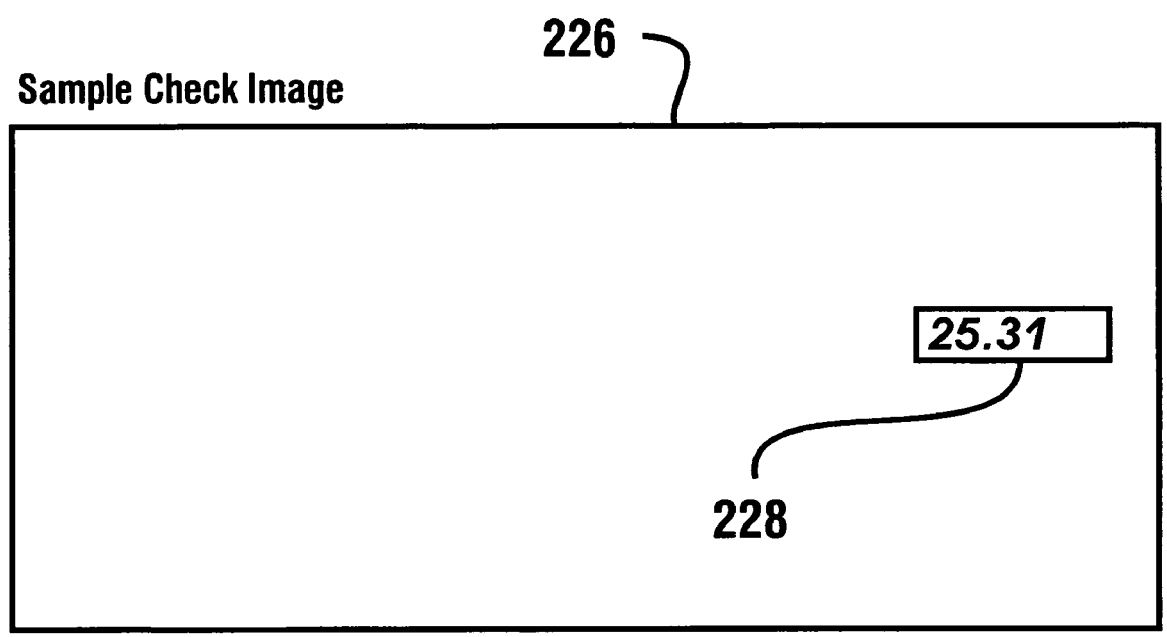
FIG. 27 is a representation of image data corresponding to a virtual check delivered to a software component in an exemplary starting sequence.

The exemplary embodiment also operates to have the first software component 222 cause data corresponding to an image of a virtual check to be provided to the second software component 224. The virtual check is generated based on data stored in a data store and includes character data to be analyzed by the recognition software component 224. FIG. 27 represents the data corresponding to a virtual check 226. In this exemplary embodiment the virtual check includes a courtesy amount 228. In the exemplary embodiment the recognition software component is operative responsive to the character values corresponding to the courtesy amount, to load into memory from the data store the instructions necessary to determine the character values corresponding to the character data which comprises the courtesy amount. The recognition software component then determines the character values and degree of assurance, and returns the result to the first software component 222. The first software component then operates in accordance with the starting sequence to verify that the results as determined by the second software component are accurate. The execution of this exemplary starting sequence thus assures that all of the instructions required of the software components 222 and 224 are loaded into RAM and are working properly. In this way when the machine is used to conduct a transaction and the software components are required to operate, there is no corresponding wait for the instructions to be loaded into RAM or otherwise tested.

In other exemplary embodiments the starting sequence may be carried out responsive to turning on the banking machine. As a result the starting sequence may be executed as part of a script for operation and testing of devices from the point of initial startup. Further in some exemplary embodiments, the starting sequence may include the analysis by the first and/or second software components of several virtual documents. These virtual documents may include documents of various types that can be analyzed by the machine. This may further help to facilitate assuring that the machine is operational to conduct an analysis of all the various types of documents that the machine may receive. In addition or in the alternative, instructions may be executed so as to periodically during machine operation, conduct an analysis of virtual documents. These actions may be carried out on a timed basis or in response to one or more messages which instruct the machine to test for proper operation. In this way the ready status and proper operation of the software components which must operate to analyze image data can be assured, and customer waiting time and malfunctions can be minimized. Of course these approaches are exemplary and in other embodiments other approaches may be used.

In some embodiments it may be desirable to execute the functions associated with document imaging on an automated banking machine in ways that work with many different types of software systems. These systems may include different types of remote host systems as well as different types of document analysis and archiving systems. Such an approach may enable ATM systems to be upgraded to operate in many different types of systems configurations. The approach may also serve to enable ATMs that are developed to operate with a particular proprietary system for check imaging, and may also provide image delivery off the banking machine to other types of check analysis and archiving systems. In addition the described approach may enable image analysis and delivery associated with checks and other documents on banking machines developed by a manufacturer, whose machine is not designed to operate the particular software components.

Figure 28:
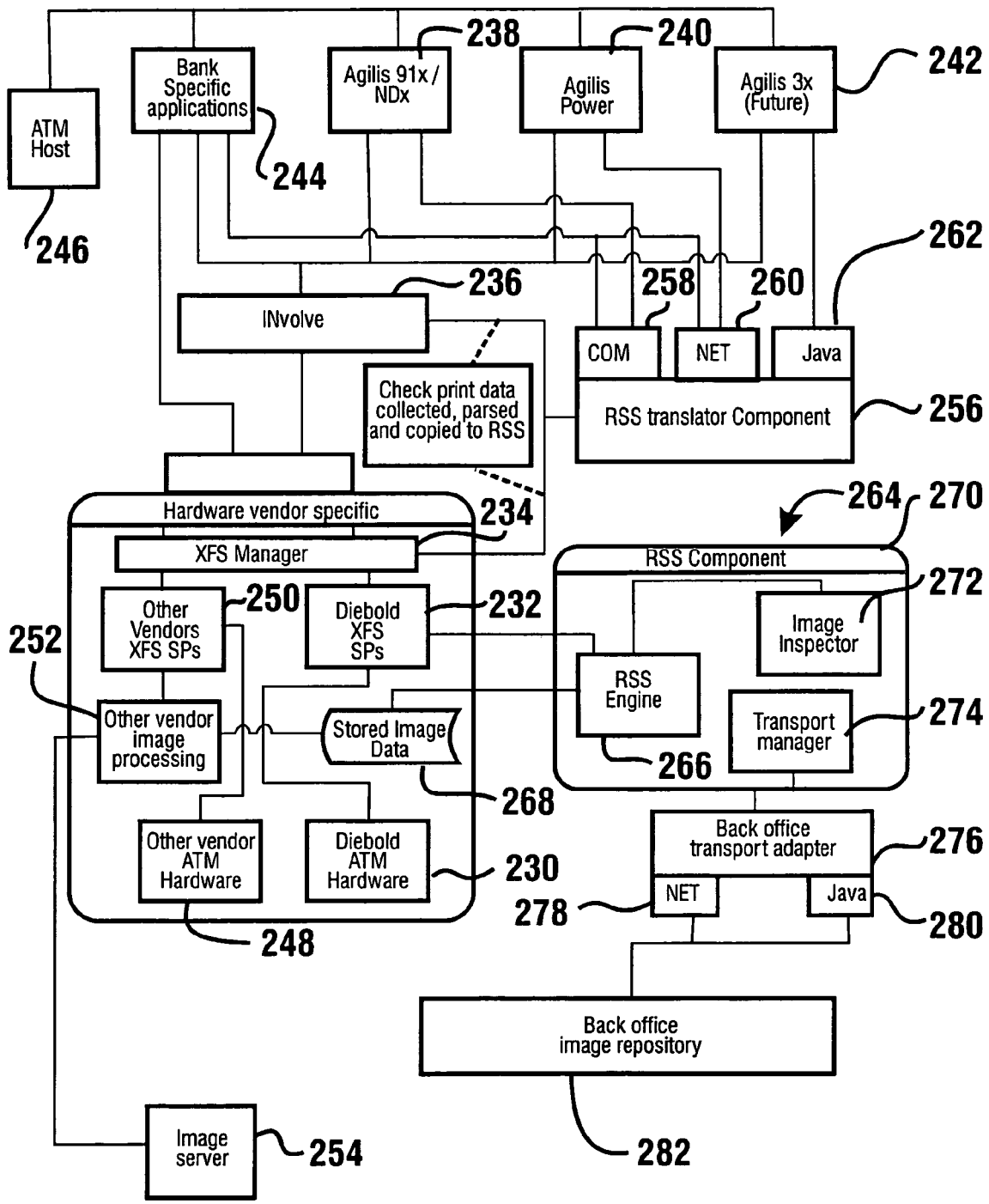
FIG. 28 is a schematic view of exemplary software components usable in connection with automated banking machines.

FIG. 28 represents schematically software components which may reside on various types of automated banking machines. It should be understood that the software components represented in FIG. 28 are those that may reside on various different types of banking machines, rather than on a single machine.

In FIG. 28 certain vendor specific hardware components are represented. For example the firmware and software components that reside on transaction function devices in an ATM made by Diebold, the assignee of the present invention, is represented by a single component 230. It should be understood that component 230 actually represents a plurality of software and/or firmware components associated with transaction function devices that reside in a banking machine. These software and firmware components may be associated for example with a card reader, a keypad, printers, document dispensers, imaging devices and other transaction function devices that reside in the machine. Component 232 represents service provider software components associated with the transaction function devices. These service provider software components of the exemplary embodiment are developed to comply with the CEN XFS Standard which provides a uniform communications interface for each particular type of device. The operation of these particular service provider software components is coordinated through operation of an XFS manager software component 234.

The XFS service provider software operates in response to communication with middleware software 236. Middleware software 236 in the exemplary embodiment comprises INvolve® software which is provided by Nexus Software. In the exemplary embodiment the INvolve software component is operative to account for differences between various manufacturers' implementation in CEN XFS compliant service provider software. Specifically the INvolve software enables instructions from an application to be effectively communicated and carried out on various types of banking machines, each of which have different service provider software despite the differences that may have been implemented by the manufacturers in connection with their service provider software.

It should be understood that middleware software component 236 may not be used in some automated banking machines, as the nature of the machines on which the software is run may not require a middleware software layer.

An automated banking machine will also include application software. In the exemplary embodiment application software is provided which is capable of being operated on numerous different types of automated banking machines. This application software controls the high level transaction functions of the machine as well as communications of the banking machine with certain remote computers. Various types of application software components can be used on machines depending on the types of systems in which the machines operate. Software component 238 is representative of a Diebold Agilis® cross platform application. Such an application may be used in systems that communicate using standardized types of ATM to host messages. Alternatively on some ATMs a customer ATM application represented 240, may be used. The custom application represented is an application developed using Diebold Agilis Power™ components which can be configured as necessary to work in various types of systems. Another type of application is represented by software component 242. This software application is representative of types that can be used in conjunction with ATM systems that communicate using IBM 473x messages. Further as schematically represented, other types of custom applications 244 may be developed and operated on various ATMs. These may include for example cross platform applications or alternatively applications that provide particular functions for the ATM and which operate in conjunction with other ATM applications. Further as schematically indicated in FIG. 28 some applications may operate transaction functions through the middleware layer of software 236 while others may communicate directly with the service provider software.

As schematically represented in FIG. 28 application software components are operative to cause the banking machine on which they are installed to communicate with one or more remote computers as represented by an ATM host 246. It should be understood that applications may communicate with various types of host computers depending on the systems on which they operate. For example host computers may operate using message formats of the Diebold 91x type, the NCR NDC type, the IBM 473x type, the IFX type or other communication methodologies. It should also be appreciated that although only a single host is shown, applications may communicate with a plurality of remote computers and networks thereof which are operative to process transactions.

As can be appreciated, the exemplary cross platform software applications are adapted to operate on automated banking machines produced by numerous different types of manufacturers. Such machines provided by other manufacturers include software and firmware components on the particular devices as represented by component 248. Such devices also include CEN XFS compliant service provider software components 250. Such service provider software operates responsive to a suitable XFS manager of the type previously discussed. In the exemplary embodiment such CEN XFS compliant software interfaces enable the same software applications and middleware to operate the same on numerous types of banking machines without the need for any significant modifications.

In some exemplary embodiments ATMs which have the capability to image checks also include certain proprietary software which is suitable for analyzing image data, such as for analyzing and imaging checks. This is represented by a software component 252. Such software components may be operative to deliver data related to document imaging transactions as well as image data, to a remote server indicated 254. In some embodiments the image server may operate a proprietary application which is operative to receive the image and transaction data related to documents received by the banking machine, and to analyze, process or otherwise facilitate the further processing of such documents. This may include for example, processing the image data in lieu of the paper check as well as processing the transaction data for purposes of settlement between the institution receiving the check and the check on which the particular institution is drawn.

In some situations it may not be acceptable to use proprietary image analysis and processing software. This may be true for example when it is desired to have images and other data related to checks which are received at the ATM, forwarded to other types of remote systems. Such forwarding may be desirable for purposes of processing, archiving or other functions.

As schematically represented in FIG. 28 the ability to analyze image data from checks and to deliver transaction and image data to numerous other systems may be provided by installing on an ATM, certain additional software components which are schematically represented. These software components may be installed in one or more data stores on the ATM and may reside in memory on a hard drive or other article which provides a suitable repository for computer executable instructions.

In this exemplary embodiment the additional software components include a translator software component schematically represented 256. Translator software component is in operative connection with the software application components that run on the banking machine. The translator software component is operative to receive transaction data from the application in which a check is received by the ATM. In some embodiments the transaction data may include at least some transaction data resolved through operation of the image processing software 252. This may include for example, character data in the image data that is resolved and sent to the application software component. The exemplary translator component 256 can receive data through a plurality of software communications interfaces. These interfaces include the Microsoft COM interface 258 and Microsoft .Net interface 260 and a Sun Microsystems Java® interface 262. Of course these interfaces are exemplary and other interfaces may be used. It should be understood that the plurality of communications interfaces of the translator software component enable the component to receive transaction data associated with a check receiving transaction from banking machine resident software applications that are architected based on different methodologies.

Further in an exemplary embodiment as schematically represented in FIG. 28, the translator software component 256 is in operative communication with the INvolve middleware 236. The communication with the INvolve middleware enables the translator component to receive the data which the application causes to be printed on transaction receipts for the customers associated with check receiving transactions. This is a further manner in which the translator software component is enabled to receive the transaction data related to each transaction.

In the exemplary embodiment, the software includes an image processing software component 264. The image processing software component operates to receive the image data that is generated by the check imaging device. This is represented in FIG. 28 by a recognition engine software component 266 which may be of the type previously discussed, receiving image data from a data store schematically indicated 268. Of course as can be appreciated, the exemplary image processing software component may also receive image data directly from one or more processors associated with a service provider software component associated with the check imaging device. This may be the case in the situation where a direct interface to receive such image data has been provided.

The exemplary image processing software component 264 further includes character recognition software 270 which operates in a manner like that previously discussed, to determine character values that are associated with character data. Further in the exemplary embodiment software component 264 includes an image quality analysis component 272 which is operative to determine the quality of the image data and whether it is suitable for further processing. Further the exemplary embodiment of the image processing software component includes a transport manager component 274 which is operative to correlate the image and transaction data so as to provide outputs suitable for use by other software components as later discussed. Of course it should be understood that these components are exemplary and in other embodiments other or different components may be used.

In the exemplary embodiment the image processing software component is operative to receive the image data produced responsive to operation of the check imaging device, which image data corresponds to checks received during transactions that are carried out by the banking machine. The image processing software component is also operative to determine the character value data which is included in the image data. This includes for example, determining the numerical values, symbols, letters and other types of visual characters that may be included on checks that are received in the machine. In addition the image processing software component is operative to correlate the image data and the corresponding transaction data. This includes correlating the data as received from the application related to how the transaction was processed, as well as data that was determined through operation of the character recognition software as corresponding to the values included on the check. Of course it should be understood that these functions are exemplary and in other embodiments other or different functions may be used.

In the exemplary embodiment the software installed on the machine further includes a transport software component schematically indicated 276. The transport software component operates to receive the data corresponding to image data and transaction data from the image processing software component 264. The transport software component is further operative to send the data corresponding to the correlated image data and transaction data to a remote computer through any one of a plurality of different software communication interfaces. These interfaces include in the exemplary embodiment a Microsoft .Net interface 278 and a Java® interface 280. Of course these communications are exemplary and in other embodiments other or additional interfaces may be used.

In the exemplary embodiment the transport software component is operative to send the correlated image and transaction data to at least one remote computer schematically indicated 282. The remote computer may include a suitable remote system or back office system that is adapted to receive image and transaction data from the banking machine. These remote systems may comprise different remote systems than those that are communicated responsive to the application. As can be appreciated installing the exemplary translator software component, image processing software component and transport software component on an automated banking machine enables the machine to communicate with software applications of various types and may not require the use of different software tailored to the particular type of application and communication methodology on the ATM. In addition the ATM is enabled to communicate with various types of systems remote from the ATM using different communications methodologies. These remote systems may in addition include different remote systems than those with which the ATM software originally installed on the ATM is designed to communicate. This may facilitate enabling the ATM to communicate check image and transaction data with numerous different types of remote computers utilizing different software methodologies. This may enable operators of ATMs and check imaging processing systems to more readily handle check transactions at the ATM.

It should be understood that the exemplary software components operative in an ATM may reside as computer executable instructions on one or more hard drives, CDs, thumb drives, flash memories or other articles within or in connection with the ATM. In addition the software components which reside on the ATM may all be loaded at the same time, or the additional software components which enable communication with various types of applications and back office systems may be loaded into memory on the ATM separately to achieve added capabilities for a previously deployed ATM. Numerous alternative approaches may be used employing the principles described herein.

Thus the apparatus and methods of the exemplary embodiments achieve at least some of the above stated objectives, eliminate difficulties encountered in the use of prior devices and systems, solve problems and attain the desirable results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations given are by way of examples and the invention is not limited to the exact details shown or described.

In the following claims any feature described as a means for performing a function shall be construed as encompassing any means capable of performing the recited function, and not mere equivalents of the particular means described in the foregoing description. The inclusion of an Abstract shall not be deemed to limit the claimed invention to the features described in such Abstract.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A method comprising:
   (a) operating an automated banking machine including a card reader, check imaging device, and a cash dispenser, to receive a check in the automated banking machine;
   (b) producing image data corresponding to a visual image of at least a portion of the check through operation of the check imaging device and at least one processor in the automated banking machine;
   (c) determining through operation of at least one first software component operating in the at least one processor, character data included in the image data, wherein the character data corresponds to at least one visible character on the check;
   (d) determining through operation of at least one second software component operating in the at least one processor, at least one character value corresponding to the character data;
   (e) including data corresponding to the at least one character value in at least one message sent from the automated banking machine to at least one first remote computer,
   (f) prior to (a), executing at least one starting sequence though operation of the at least one processor, wherein the at least one starting sequence includes loading instructions of at least one first software component and instructions of at least one second software component from at least one data store in the machine to at least one random access memory in operative connection with the at least one processor.

2. The method according to claim 1 wherein in (f) the starting sequence includes the at least one first software component causing image data corresponding to an image of at least one virtual check to be provided to the at least one second software component.

3. The method according to claim 2 wherein in (f) the starting sequence includes the at least one second software component determining at least one character value included in the image data corresponding to the at least one virtual check.

4. The method according to claim 3 wherein in (f) the starting sequence includes operating the at least one first software component to cause template data to load from the at least one data store to the at least one random access memory, wherein in (c) the template data is used by the at least one first software component to identify character data in image data.

5. The method according to claim 4 wherein in (f) the starting sequence includes operating the first software component to load the image data corresponding to the at least one virtual check, from the at least one data store to the at least one random access memory.

6. The method according to claim 5 wherein the automated banking machine includes at least one printer, and wherein in (f) the starting sequence includes operating the at least one first software component to determine the at least one property of the at least one printer.

7. The method according to claim 6 and further comprising:
   (g) printing a document through operation of the at least one printer, wherein the document includes a visual representation of the check received in (a), responsive to the image data produced in (b) and the at least one property determined in (f).

8. The method according to claim 1 and further comprising:
   (g) dispensing cash from the automated banking machine through operation of the cash dispenser.

9. The method according to claim 8 and further comprising:
   (h) including data corresponding to image data produced in (b) in at least one message sent from the banking machine to at least one second remote computer.

10. The method according to claim 9 and further comprising:
    (i) prior to (a) turning on the automated banking machine;
    (j) prior to (a) reading a user card through operation of the card reader, wherein the user card is a first card read after (i);
    wherein (f) is executed after (i) and prior to (j).

11. The method according to claim 1 wherein in (f) the starting sequence includes:
    (i) loading at least one template from the at least one data store into the at least one random access memory;
    (ii) loading virtual image data corresponding to at least one virtual check from the at least one data store to the at least one random access memory;
    (iii) determining through operation of the at least one second software component, at least one character value included in the virtual image data.

12. The method according to claim 1 and further comprising:
    (g) prior to (a) turning on the automated banking machine;
    (h) prior to (a) reading a user card through operation of the card reader, wherein the user card is a first card read by the machine after (g);
    wherein (f) is executed after (g) and prior to (h).

13. At least one computer readable medium including computer executable instructions, wherein the instructions when executed by at least one processor, are operative to cause an automated banking machine including a check imaging device, a cash dispenser, and at least one processor, to carry out a method, comprising:
    (a) operating the automated banking machine to receive a check;
    (b) producing image data corresponding to a visual image of at least a portion of the check responsive to operation of the check imaging device and the at least one processor of the automated banking machine;
    (c) determining through operation of at least one first software component operating in the at least one processor of the automated banking machine, character data included in the image data, wherein the character data corresponds to at least one visible character on the check;
    (d) determining through operation of at least one second software component operating in the at least one processor of the automated banking machine, at least one character value corresponding to the character data;

(e) including data corresponding to the at least one character value in at least one message sent from the automated banking machine to at least one first remote computer; and (f) prior to (a), executing at least one starting sequence responsive to operation of the at least one processor of the automated banking machine, wherein the at least one starting sequence includes loading instructions of at least one first software component and instructions of at least one second software component from at least one data store in the machine to at least one random access memory in operative connection with the at least one processor of the automated banking machine.

14. A method comprising:

(a) carrying out at least one starting sequence through operation of at least one processor in an automated banking machine including a card reader, a check imaging device and a cash dispenser, wherein the at least one starting sequence includes loading into at least one random access memory in operative connection with at least one processor, software instructions adapted to determine character data which corresponds to at least one character within image data which corresponds to a visual image of a check, and to determine at least one character value that corresponds to the character data;

(b) subsequent to (a), receiving a check in the banking machine;

(c) producing image data corresponding to a visual image of the check received in (b);

(d) determining at least one character value on the check responsive to the image data produced in (c), through operation of the software instructions loaded into the at least one random access memory in (a).

15. The method according to claim 14 and further comprising:

(e) turning on the automated banking machine;

(f) reading indicia from a user card through operation of the card reader of the automated banking machine, wherein the user card is the first card read subsequent to (e);

wherein (a) is executed prior to (f).

16. The method according to claim 15 wherein the starting sequence in (a) includes loading data corresponding to a plurality of templates from at least one data store into at least one random access memory, wherein the plurality of templates are adapted to be used to determine character data within image data.

17. The method according to claim 16 wherein the starting sequence in (a) includes operating the at least one processor to determine at least one character value represented by character data in a virtual check.

18. The method according to claim 16 wherein the starting sequence in (a) includes loading into the at least one random access memory from the at least one data store, a plurality of computer executable instructions of a first software component, wherein the first software component is operative to determine character data responsive to the data corresponding to the plurality of templates.

19. The method according to claim 18 wherein the starting sequence in (a) includes loading into the at least one random access memory from the at least one data store, a plurality of computer executable instructions of a second software component, wherein the second software component is adapted to determine character values.

20. The method according to claim 19 and prior to (d), determining character data in the image data produced in (c) through operation of the first software component, and wherein in (d) the at least one character value is determined through operation of the second software component.

21. The method according to claim 20 and further comprising:

(g) including the at least one character value in at least one message sent by the banking machine to at least one remote computer.

22. The method according to claim 21 and further comprising:

(h) sending the image data from the automated banking machine to at least one remote computer.

23. The method according to claim 19 wherein in (a) the starting sequence includes operating the first software component to cause character data corresponding to the virtual check to be delivered to the second software component.

24. The method according to claim 15 and further comprising:

(g) dispensing cash from the automated banking machine responsive to operation of the cash dispenser;

(h) sending at least one message from the automated banking machine to at least one remote computer including indicia read from the card in (f), wherein the at least one message is operative to cause an account associated with the user card to be assessed for cash dispensed.

25. At least one computer readable medium including computer executable instructions, wherein the instructions when executed by at least one processor, are operative to cause an automated banking machine including a check imaging device, a cash dispenser, and at least one processor, to carry out a method comprising:

(a) carrying out at least one starting sequence responsive to operation of the at least one processor of the automated banking machine, wherein the at least one starting sequence includes loading into at least one random access memory, software instructions adapted to determine character data which corresponds to at least one character within image data which corresponds to a visual image of a check, and to determine at least one character value that corresponds to the character data;

(b) receiving a check in the automated banking machine subsequent to carrying out the at least one starting sequence;

(c) producing image data corresponding to a visual image of the check received in (b); and (d) determining at least one character value on the check responsive to the image data, through operation of the software instructions loaded into the at least one random access memory in (a).

* * * * *